(12) United States Patent
Valenza et al.

(10) Patent No.: US 12,041,461 B2
(45) Date of Patent: Jul. 16, 2024

(54) THREE-DIMENSIONAL VISUALIZATION OF WI-FI SIGNAL PROPAGATION

(71) Applicant: Cisco Technology, Inc., San Jose, CA (US)

(72) Inventors: Salvatore Valenza, Pomy (CH); Samer Salam, Beirut (LB); Taha Hajar, Chavannes-Renens (CH); Nikodin Ristanovic, Lausanne (CH); Arun G. Khanna, Sunnyvale, CA (US); Min Se Kim, Cupertino, CA (US); Matthew Aaron Silverman, Shaker Heights, OH (US); James Florwick, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 269 days.

(21) Appl. No.: 17/481,815

(22) Filed: Sep. 22, 2021

(65) Prior Publication Data
US 2023/0027175 A1    Jan. 26, 2023

Related U.S. Application Data

(60) Provisional application No. 63/224,332, filed on Jul. 21, 2021.

(51) Int. Cl.
*H04W 16/22* (2009.01)
*G06T 15/06* (2011.01)
(Continued)

(52) U.S. Cl.
CPC ............ *H04W 16/22* (2013.01); *G06T 15/06* (2013.01); *G06T 19/00* (2013.01); *H04W 16/20* (2013.01)

(58) Field of Classification Search
CPC ......... G06T 15/06; G06T 17/05; G06T 19/00; G06T 19/006; G06T 19/20;
(Continued)

(56) References Cited

U.S. PATENT DOCUMENTS 6,317,599 B1 * 11/2001 Rappaport .............. G01F 23/80
                                                        703/22
6,499,006 B1 * 12/2002 Rappaport ......... H04B 17/3913
                                                        703/20

(Continued)

FOREIGN PATENT DOCUMENTS

WO    2020007483    1/2020

OTHER PUBLICATIONS

Vasiliadis, T., Dimitriou, A. and Sergiadis, G., Mar. 2003, An efficient representation of combined indoor/outdoor 3D mobile radio-coverage. In Twelfth International Conference on Antennas and Propagation, 2003 (ICAP 2003).(Conf. Publ. No. 491) (vol. 2, pp. 792-795). IET. (Year: 2003).*

(Continued)

*Primary Examiner* — King Y Poon
*Assistant Examiner* — Vincent Peren
(74) *Attorney, Agent, or Firm* — Polsinelli P.C.

(57) ABSTRACT

The present technology is directed to visualizing a Wi-Fi signal propagation in 3-D at various heights and locations. The present technology can calculate a radio frequency (RF) propagation pattern for a Wi-Fi access point (AP) based on a RF propagation model for the Wi-Fi AP and overlay the RF propagation pattern for the Wi-Fi AP over a visualization of the building plan to present a 3-D visualization of the RF propagation pattern of the 3-D space. In particular, the present technology can project a plurality of ray-paths in various directions in a 3-D space originated from the Wi-Fi AP and determine whether the ray-paths interface with (Continued)

objects defined in the building plan. The present technology can segment the respective ray-path into contiguous segments of substantially uniform mediums for each ray-path that interface with the objects and determine a RF signal strength at points along the contiguous segments of the ray-paths.

20 Claims, 15 Drawing Sheets

(51) Int. Cl.
*G06T 19/00* (2011.01)
*H04W 16/20* (2009.01)

(58) Field of Classification Search
CPC . G06T 2207/20212; G06T 2207/20221; G06T 2210/04; G06T 2219/2004; H04W 16/22; H04W 16/225; H04W 16/00; H04W 16/20; H04W 24/06
See application file for complete search history.

(56) References Cited

U.S. PATENT DOCUMENTS

| | | | |
|---|---|---|---|
| 9,131,403 B1 | 9/2015 | Courchesne et al. | |
| 11,212,684 B2* | 12/2021 | Hadley | H04W 16/20 |
| 2003/0014233 A1 | 1/2003 | Rappaport et al. | |
| 2003/0229478 A1* | 12/2003 | Rappaport | H04W 16/20 |
| | | | 703/13 |
| 2004/0143428 A1* | 7/2004 | Rappaport | H04L 41/12 |
| | | | 703/22 |
| 2004/0259554 A1* | 12/2004 | Rappaport | H04W 16/18 |
| | | | 455/446 |
| 2009/0278849 A1* | 11/2009 | Williams | G06T 11/206 |
| | | | 345/441 |
| 2011/0263277 A1 | 10/2011 | Gallegos | |
| 2015/0142391 A1 | 5/2015 | Flynn et al. | |
| 2016/0323760 A1 | 11/2016 | Zhang et al. | |
| 2021/0201583 A1* | 7/2021 | Bovensiepen | G06T 7/593 |

OTHER PUBLICATIONS

Lee, Gunhak. "3D coverage location modeling of Wi-Fi access point placement in indoor environment." Computers, environment and urban systems. (2015) 54: pp. 326-335. (Year: 2015).*
Vasiliadis, T., Dimitriou, A. and Sergiadis, G., Mar. 2003, An efficient representation of combined indoor/outdoor 3D mobile radio-coverage. In Twelfth International Conference on Antennas and Propagation, 2003 (ICAP 2003). (Conf. Publ. No. 491) (vol. 2, pp. 792-795). IET. (Year: 2003) (Year: 2003).*
Lee, Gunhak. "3D coverage location modeling of Wi-Fi access point placement in indoor environment." Computers, environment and urban systems. (2015) 54: pp. 326-335. (Year: 2015) (Year: 2015).*
International Search Report and Written Opinion for PCT application No. PCT/US2022/037705, mailed on, Mar. 22, 2023, 14 pages.
Madej Przemyslaw, "3D Wireless Networks Simulator—visualization of Radio Frequency propagation for WLANs," Master of Science in Computer Science, May 31, 2006, XP055779624, pp. 1-98.

* cited by examiner

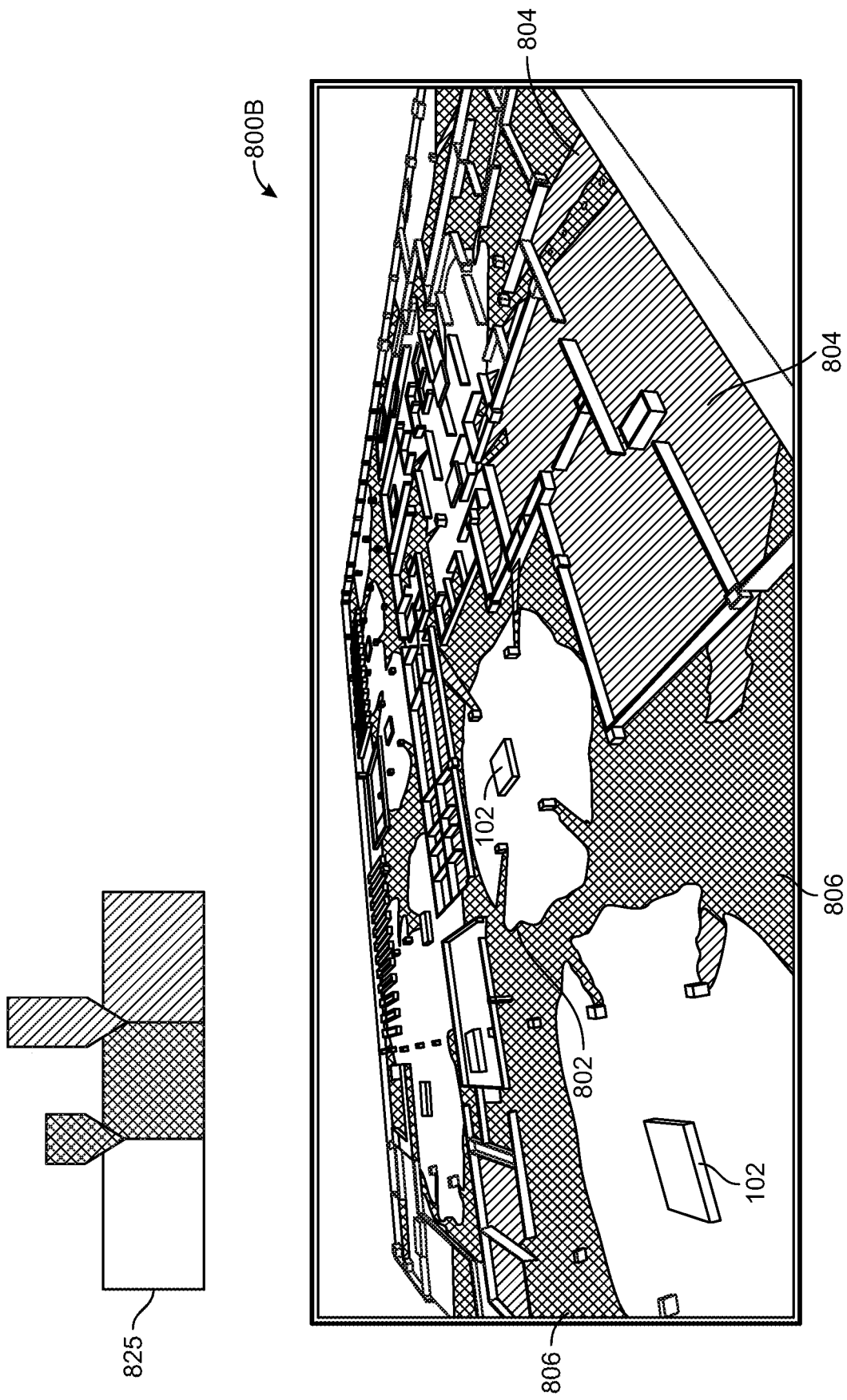

THREE-DIMENSIONAL VISUALIZATION OF WI-FI SIGNAL PROPAGATION

CROSS-REFERENCE TO RELATED APPLICATIONS

This application claims priority to U.S. provisional application No. 63/224,332 filed on Jul. 21, 2021, which is expressly incorporated by reference herein in its entirety.

TECHNICAL FIELD

The subject matter of this disclosure relates in general to the field of wireless networks, and more particularly, to systems and methods for providing a three-dimensional (3-D) visualization of a wireless signal propagation at various heights and locations.

BACKGROUND

With growing interest in optimizing the wireless network infrastructure to improve the wireless network performance, various wireless network planning tools are available for analyzing, visualizing, and troubleshooting the wireless signal propagation (e.g., Wi-Fi coverage) of the wireless network. A visualization of the wireless signal propagation can help understanding the signal propagation (i.e., assessing the signal propagation behavior) and validating the signal propagation based on signal level measurements from APs and sensors so that an optimized wireless network can be designed as to where to place or how to configure Wi-Fi access points.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIGS. 8A and 8B illustrate example 3-D visualizations of a wireless signal propagation at different heights according to some aspects of the disclosed technology.

DETAILED DESCRIPTION

Figure 1:
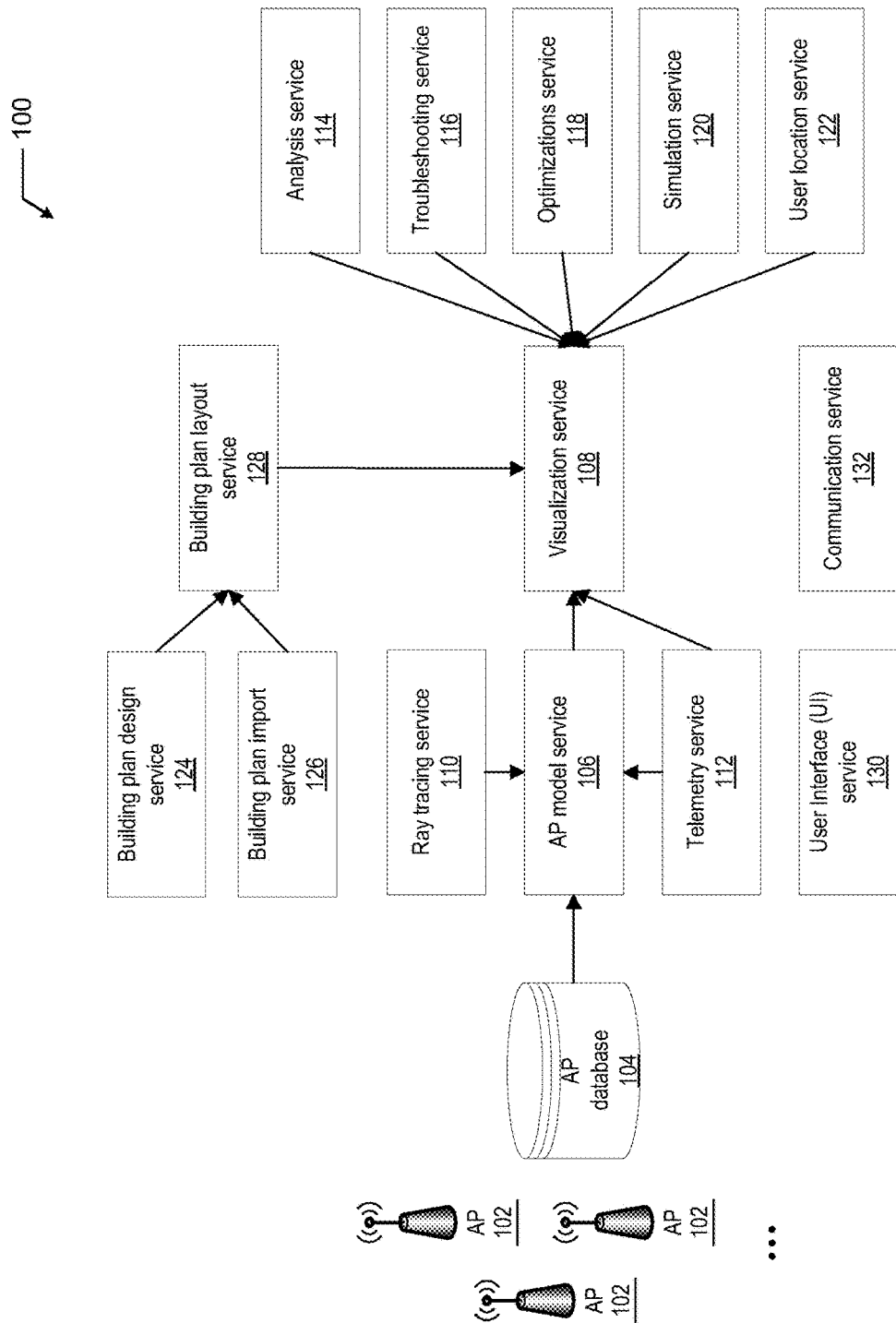
FIG. 1 illustrates an example visualization system for presenting a wireless signal propagation in 3-D according to some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In order to aid with designing and planning a wireless network, various wireless network planning tools are available for analyzing, simulating, visualizing, and troubleshooting the wireless signal propagation of the wireless network. Some tools provide a simulation of Wi-Fi coverage by predicting a wireless signal propagation at one height and filling the entire 3-D volume uniformly. However, such approximations cannot accurately represent the dynamic network environment. A building structure that has unconventional geometry, objects placed at different heights (e.g., high racks), or a type of materials stored in the objects can significantly affect network performance and cause varying Wi-Fi propagation patterns at different heights and locations.

Therefore, there exists a need for 3-D visualization of Wi-Fi signal propagation at various heights and locations in a 3-D space. The present technology includes systems, methods, and computer-readable media for solving these problems and discrepancies. Specifically, systems, methods, and computer-readable media for providing a 3-D visualization of a Wi-Fi signal propagation at varying heights and locations are provided in the present disclosure.

Overview

The present technology includes systems, methods, and computer-readable media are provided for visualizing a Wi-Fi signal propagation at various heights and locations in 3-D.

Disclosed are systems, apparatuses, methods, computer readable medium, and circuits for visualizing a Wi-Fi access point RF propagation pattern in 3-D. According to at least one example, a method includes calculating a RF propagation pattern for at least one Wi-Fi access point based on a RF propagation model for the at least one Wi-Fi access point and overlaying the RF propagation pattern for the at least one Wi-Fi access point over a visualization of the building plan to present a 3-D visualization of the RF propagation pattern of the 3-D space.

In particular, the calculating includes projecting a plurality of ray-paths in a plurality of directions in a 3-D space, wherein the ray-paths originate from the at least one Wi-Fi access point and emanate in a variety of X, Y, and Z planes, determining whether the ray-paths interface with one or more objects defined in a building plan; for each ray-path of the ray-paths that interface with the one or more objects defined in the building plan, segmenting the respective ray-path into contiguous segments of substantially uniform mediums, and determining a RF signal strength at points along the contiguous segments of the ray-paths, wherein the RF signal strength degrades along the contiguous segments of the ray-paths as defined by the RF propagation model as a function of distance through the contiguous segments and characteristics of the RF propagation pattern through the substantially uniform mediums through which the segment traverses.

In another example, a system for visualizing a RF propagation pattern at various heights and locations in 3-D (e.g., 3-D signal propagation visualization system) is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the one or more processors (e.g., a visualization service) to calculate a RF propagation pattern for at least one Wi-Fi access point based on a RF propagation model for the at least one Wi-Fi access point and overlay the RF propagation pattern for the at least one Wi-Fi access point over a visualization of the building plan to present a 3-D visualization of the RF propagation pattern of the 3-D space.

A non-transitory computer-readable storage medium having stored therein instructions which, when executed by one or more processors (e.g., a visualization service), can cause the one or more processors to calculate a RF propagation pattern for at least one Wi-Fi access point based on a RF propagation model for the at least one Wi-Fi access point and overlay the RF propagation pattern for the at least one Wi-Fi access point over a visualization of the building plan to present a 3-D visualization of the RF propagation pattern of the 3-D space.

DESCRIPTION

FIG. 1 illustrates an example 3-D signal propagation visualization system 100 for presenting a wireless signal propagation in 3-D according to some aspects of the disclosed technology. As shown in FIG. 1, the 3-D signal propagation visualization system 100 can include one or more services primarily responsible for examining and analyzing signals from a plurality of access points (APs) 102A, 102B, 102C, . . . (collectively, 102), determining a signal propagation pattern for the APs 102 based on a signal propagation model, and providing a 3-D visualization of the signal propagation pattern including analysis, troubleshooting, simulations, or optimizations of the signal propagation pattern.

The 3-D signal propagation visualization system 100 can include an AP database 104 that includes information about the plurality of APs 102, which are configured to transmit wireless communication signals. In some aspects, the information about the plurality of APs 102 can include, but is not limited to a location of APs 102 and their orientation (e.g., azimuth and elevation angles), a model number, a signal strength, end-of-life data, an antenna type, a channel, a frequency (band), or network information of which the APs 102 belong.

The 3-D signal propagation visualization system 100 can include an AP model service 106 that is a collection of signal propagation models for different types of AP antennae 102.

In some examples, the signal propagation model includes a description of the signal propagation pattern based on the information associated with the AP antennae 102. For example, such information can be provided by the AP database 104 or related to parameters derived from various configuration attributes and measurements such as transmission power (txPower), signal-to-noise ratio (SNR), Key Performance Indicator (KPI) values, or Received Signal Strength Indication (RSSI) values.

The 3-D signal propagation visualization system 100 can include a visualization service 108 configured to perform 3-D modeling, i.e., display a 3-D visualization of the signal propagation pattern based on the signal propagation model, the antenna pattern of the Wi-Fi AP, the configuration of the Wi-Fi AP (txPower, azimuth angle, elevation, band and channel) and the geometry of a space as defined in a building plan. In some examples, the visualization service 108 can display the 3-D visualization of the signal propagation in the form of a heatmap, which uses color-coding to represent different values of the signal strength. In some instances, the visualization service 108 can generate a time-based (temporal) visualization where changes in the signal propagation pattern over time can be presented in the 3-D visualization.

The 3-D signal propagation visualization system 100 can also include a ray tracing service 110 configured to perform ray tracing from a particular AP. In some examples, the ray-tracing service 110 can compute attenuation based on the line-of-sight from a particular AP to a certain vertex in space. For example, ray tracing can be used to visualize the signal propagation by tracing paths of electromagnetic waves and simulating the way that the waves interact with any objects it may hit. If a straight line is drawn from a particular AP and does not hit anything in the space, then the signal propagation model works in a straightforward manner. On the other hand, if there is an obstacle (e.g., a wall, shelving, ceiling, etc.) along the path, the signal propagation pattern can be broken into multiple segments since the signal propagation pattern can change depending on the properties of the obstacle that the pattern has to pass through.

The 3-D signal propagation visualization system 100 can include a telemetry service 112 configured to collect and record data from the plurality of APs 102 or sensors on the floor pertaining to the APs 102 in space. In some examples, the telemetry data can be used to update information about a particular AP (e.g., model, antenna type, etc.) or feed into the visualization service 108 to provide an optimized 3-D visualization instead of relying on a predicted model. In some instances, the telemetry service 112 can utilize the telemetry data to validate a certain predicted model.

The 3-D signal propagation visualization system 100 can also include an analysis service 114 that is configured to analyze data associated with the wireless coverage such as SNR measurements, latency measurements, a number of client devices associated with each of the APs, KPI values, txPower measurements, or RSSI measurements. In some instances, the analysis service 114 can further perform analysis pertaining to data associated with one or more errors or constraints of the APs 102 that can impact the wireless coverage.

The 3-D signal propagation visualization system 100 can include a troubleshooting service 116 configured to perform various types of troubleshooting by isolating and root-causing issues or errors relating to the network performance and signal propagation pattern based on the APs 102 and providing suggestions to resolve such issues or errors. In some examples, the troubleshooting service 116 can identify both cause and consequences of the issues, for example, obstructions in the line of sight, a level of signal coverage, a number of client devices connected to APs, co-channel interference, or stickiness of roaming clients to APs.

The 3-D signal propagation visualization system 100 can include an optimization service 118 configured to provide a 3-D visualization of the optimized signal propagation pattern that provides better operational signal coverage and lower interference. In some examples, the optimization service 118 can provide an upgrade option for the APs or configuration settings to achieve improved network performance. In some instances, the optimization service 118 can provide the optimized 3-D visualization that illustrates dynamic changes as conditions in the network change. In some examples, the optimization service 118 can propose different optimized layouts by radio spectrum (RF) or deployment of the APs for a given space.

The 3-D signal propagation visualization system 100 can also include a simulation service 120 configured to simulate various scenarios relating to deployment of APs, potential network failures, estimated RF leakage, or alternative network configurations. In some instances, the simulation service 120 can provide a simulated 3-D visualization of the various proposed layouts provided by the optimization service 118.

In some examples, the simulation service 120 can provide a simulated 3-D visualization illustrating the impact of an alternative deployment of APs, for example, how the signal propagation pattern is impacted by deploying a new or upgraded AP at different locations on the floor. Also, the simulation service 120 can simulate a 3-D visualization based on the impact of an upgrade or different AP upgrade strategies prior to the actual update to observe and compare the wireless coverage.

Furthermore, a type of materials of obstructions in the space can significantly impact the signal propagation pattern. The simulation service 120 can provide a simulated visualization of the signal propagation pattern depending on the type of materials of obstacles such as walls or shelving, or what is stored on shelving (e.g., liquid, metal, non-metal, etc.).

Additionally, the simulation service 120 can provide a simulated 3-D visualization illustrating potential network failures. For example, the simulation service 120 can help define coverage zones to avoid coverage blackout zones in common.

The 3-D signal propagation visualization system 100 can also include a user location service 122 configured to identify a location of a user (e.g., client device) and obtain data associated with the user/client device to determine the signal propagation pattern. For example, a client density can significantly affect the wireless network coverage.

In some examples, the user location identified by the user location service 122 can be combined with an AP coverage so that the 3-D visualization can include the impact of the client device such as an operating system of client devices, client device density, or any RF interference due to the presence of RF-emitting device (e.g., mobile phones, cordless phones, wireless security cameras, etc.).

In some examples, the user location service 122 can help to optimize the latency and the signal propagation pattern by identifying the location of client devices and the type of services that the client devices are performing. For example, too many client devices performing VoIP calls on the same AP can worsen the network performance and cause a bad call quality due to latencies. The 3-D visualization of the signal propagation pattern can include the user location provided by the user location service 122 to illustrate such impact of the client devices on the wireless network coverage.

The 3-D signal propagation visualization system 100 can also include a building plan design service 124 configured to allow a user to manage the settings of the building plan or the floor plan of the space (e.g., layout, objects, viewpoint, etc.).

The 3-D signal propagation visualization system 100 can include a building plan import service 126 configured to import a building plan or a floor plan. The building plan or the floor plan can be in any suitable format, for example, a Building Information Modeling (BIM) file or a Computer-Aided Design (CAD) file. In some examples, the building plan import service 126 can import the building plan or the floor plan that contains a technical drawing, blueprint, schematic, or 3-D rendering of the floor that is to be visualized in 3-D.

In some instances, the signal propagation pattern can be overlaid over the building plan or the floor plan provided by the building plan import service 126. Depending on the type of the imported file for the building plan, details of the building or the floor such as a type of materials of the obstacles (e.g., a wall, etc.) or location of APs or sensors can further be included in the building plan.

The 3-D signal propagation visualization system 100 can also include a building plan layout service 128 configured to store the building plan layout and support the 3-D visualization of the building plan layout. In some examples, the building plan layout service 128 can perform the function of a management and control platform for managing, monitoring, and storing data associated with the visualization based on the building plan.

The 3-D signal propagation visualization system 100 can also include a user interface service 130 configured to allow a user to manage and control settings of the visualization or network configurations to optimize the 3-D visualization. For example, the settings can include a viewpoint (e.g., a first-person perspective, an orbit view, or a bird's eye view), layout, parameters (e.g., txPower, SNR measurements, KPI values, RSSI values, etc.), or visualization options. Also, the examples of network configurations can include but are not limited to elevation or azimuth angle of APs, deployment of APs, band and a type of network or APs.

In some instances, the user interface service 130 can provide information to or receive feedback from the user via a communication service 132 as further described below. In some examples, the user may be asked to evaluate and manage various suggestions proposed by the troubleshooting service 116 or the optimization service 118.

The 3-D signal propagation visualization system 100 can also include a communication service 132 configured to transmit and receive information wirelessly over a network. In some examples, the communication service 132 can send and receive communications from/to a building plan system (not shown) that may provide building plan updates. In some instances, the communication service 132 can transmit and receive data from/to a user for analyzing, troubleshooting, simulating, or optimizing the 3-D visualization of the signal propagation pattern.

Figure 2:
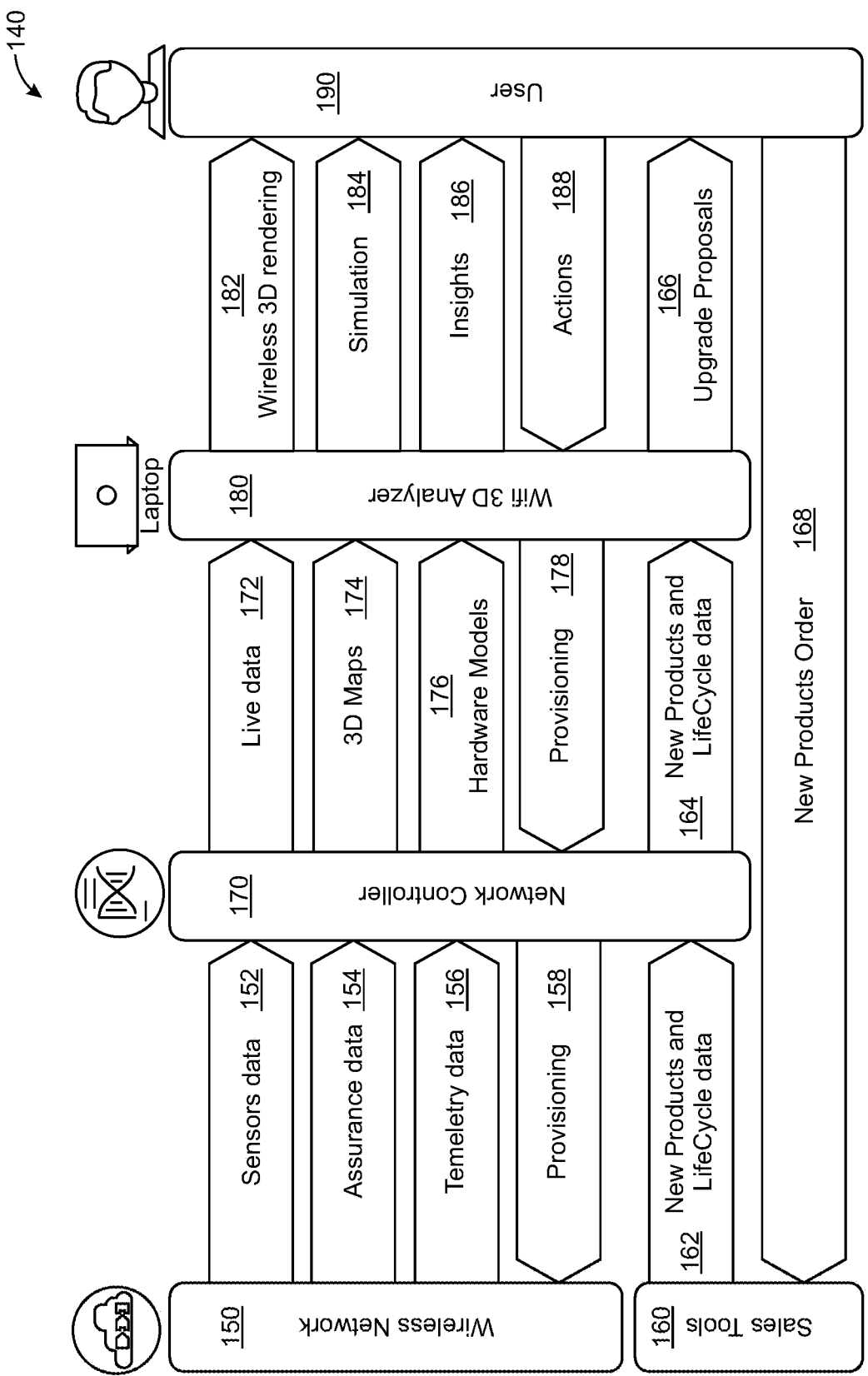
FIG. 2 illustrates an example network architecture of a visualization system for presenting a wireless signal propagation in 3-D according to some aspects of the disclosed technology.

FIG. 2 illustrates an example network architecture 140 for the 3-D signal propagation visualization system 100 illustrated in FIG. 1 according to some aspects of the disclosed technology. The network architecture 140 comprises a wireless network 150, sales tools 160, a network controller 170, a Wi-Fi 3D analyzer 180, and a user 190. In some embodiments, Wi-Fi 3D analyzer 180 executes on a client device and takes advantage of hardware acceleration capabilities from a graphics processor, but Wi-Fi 3D analyzer 180 can operate in other environments such as a server or on a device with only general processing capabilities, or in a cloud environment. Even though the network controller 170 and Wi-Fi 3D analyzer 180 are illustrated as separate components in FIG. 2, in some examples, they can be a single device (i.e., the Wi-Fi 3D analyzer 180 is run on the network controller 70 itself) or run in a virtualized cloud environment.

The wireless network 150 comprises APs 102 illustrated in FIG. 1, sensor(s), and user devices. The network controller 170 can include AP database 104, AP model service 106, telemetry service 112, user location service 122, building plan design service 124, building plan import service 126, and building plan layout service 128, all of which are illustrated in FIG. 1. The Wi-Fi 3D analyzer 180 can include visualization service 108, analysis service 114, troubleshooting service 116, optimizations service 118, simulation service 120, and user interface service 130, all of which are also illustrated in FIG. 1.

The wireless network 150 can transmit sensor data 152, assurance data 154, and/or telemetry data 156 to the network controller 170. The network controller 170 can store such received data and can provide user interfaces and APIs for receiving network configurations and updates. Network configurations can be used to provision 158 various devices in wireless network 150. Also, the network controller 170 can transmit live data 172, 3-D maps 174 (e.g., 3-D building plans or floor plans), and/or hardware models 176 to the Wi-Fi 3D analyzer. While not shown in FIG. 2, alternatively, live data 172, 3-D maps 174, and/or hardware models 176 can be exported to cloud instead of a local PC or GPU and provide user 190 with insights 186.

The Wi-Fi 3D analyzer 180 can use the 3-D maps 174 and hardware models 176 to generate predictions or simulations of wireless signal propagation and their correlation with the live data 172. Based on the data received from the network controller 170, the Wi-Fi 3-D analyzer 180 can provide wireless 3-D rendering 182, simulation 184, and/or insights 188 to the user 190. For example, the user can be provided with the wireless 3-D rendering 182 of the wireless signal coverage (e.g., RF coverage) and options to run simulations 184 for what-if scenarios, and insights 186 including suggestions for improving the network performance associated with the wireless signal coverage. Based on what is provided by the Wi-Fi 3D analyzer 180, the user 190 can take action 188 accordingly, for example, modifying a network configuration to improve the network performance. Wi-Fi 3D analyzer 180 can forward any updates to the network configuration for provisioning 178 to the network controller 170.

Furthermore, the sales tools 160 can provide a product upgrade management based on the communication flow between the sales tools 160, the network controller 170, and the Wi-Fi 3D analyzer 180. The sales tools 160 can transmit new products and lifecycle data 162 to the network controller 170. Then the network controller 170 forwards the new products and lifecycle data 164 to the Wi-Fi 3D analyzer 180. The new products and lifecycle data 162 and 164 can include new product availability for sale or end-of-life dates for AP products.

Based on the new products and lifecycle data 164, the Wi-Fi 3D analyzer 180 can provide upgrade proposals 166, which can include simulation 184 and insights 186 on product upgrade, to the user 190. Also, in response to the upgrade proposals, the user 190 can place a new product order 168 by utilizing the sales tools 160. For example, the new products and lifecycle data 162 can include end-of-life data associated with a particular AP so that an upgrade or replacement of a new AP can be recommended based on the end-of-life data prior to the expiry of the AP. Also, the user 190 can place an order for a new AP with the sales tools 160.

Figure 3:
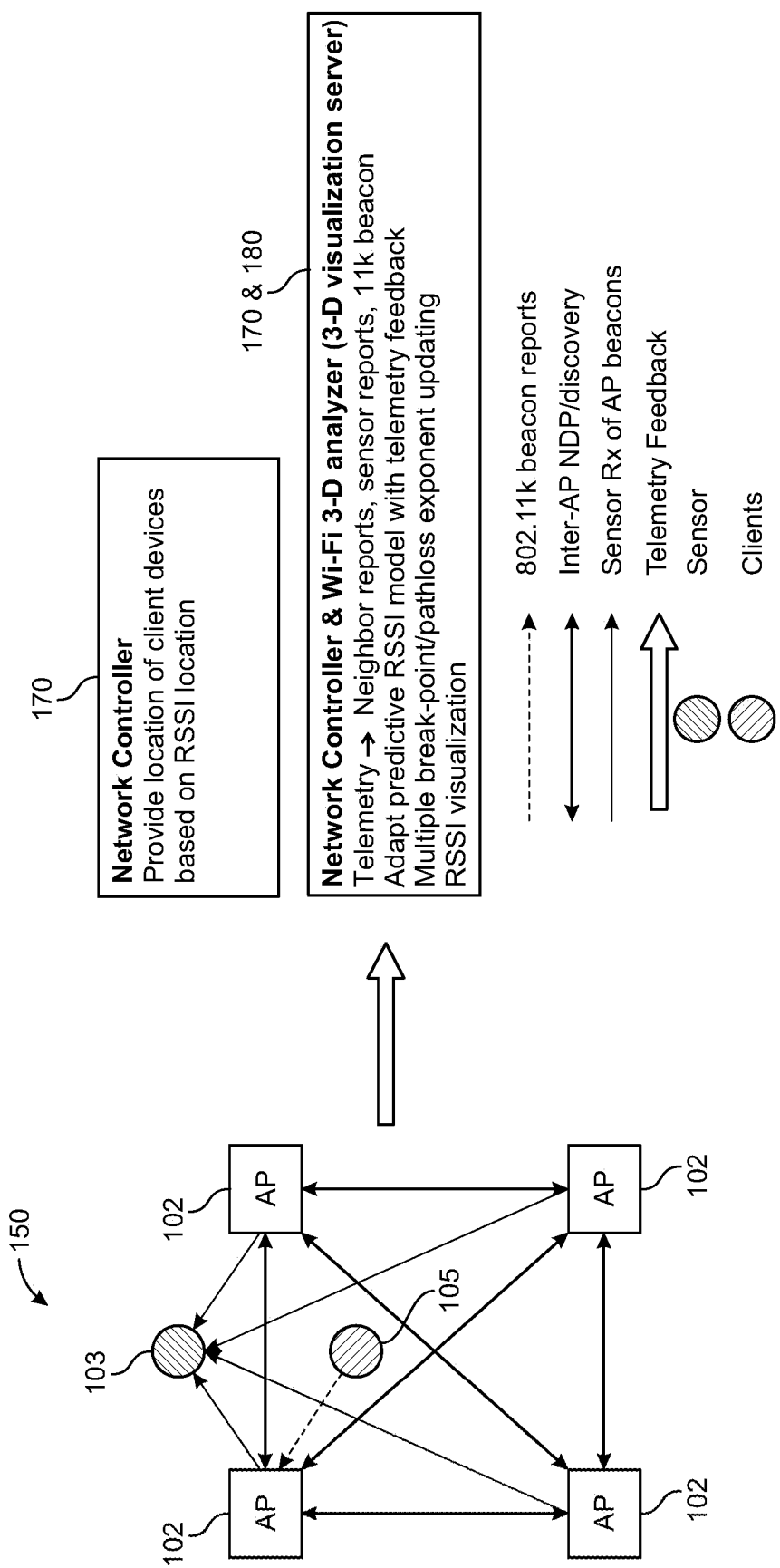
FIG. 3 illustrates an example network architecture diagram of a visualization system for presenting a wireless signal propagation in 3-D according to some aspects of the disclosed technology.

FIG. 3 illustrates an example network architecture diagram for a wireless network 150, a network controller 170, and a Wi-Fi 3-D analyzer 180 according to some aspects of the disclosed technology. The wireless network 150, also illustrated in FIG. 2, comprises APs 102 and sensors 103 and client devices 105.

The wireless network 150 can transmit telemetry feedback (for example, telemetry data 156 illustrated in FIG. 2) to the network controller 170. For example, each AP 102 transmits beacons to the sensor 103 whereby a sensor report can be generated. Also, the APs 102 communicate with each other via inter-AP Neighbor Discovery Protocol (NDP) to generate neighbor reports. Furthermore, client device 105 measures beacons and returns a report with stored beacon information (e.g., 802.11k beacon reports). Based on the neighbor reports, 802.11k beacon reports, and sensor reports, the wireless network 150 provides telemetry feedback to the network controller 170. The telemetry feedback can include information about a distance and azimuth angle between a pair of APs or an AP and a sensor and walls or any obstructions between the pair on a building plan or a floor plan. Also, network controller 170 includes location information of client devices based on RSSI location, which is received from the wireless network 150.

Based on the data provided by the wireless network 150, the network controller 170 and the Wi-Fi 3-D analyzer 180 can determine a predictive RSSI model and visualize the predicted RSSI at all 3-D locations.

Figure 4:
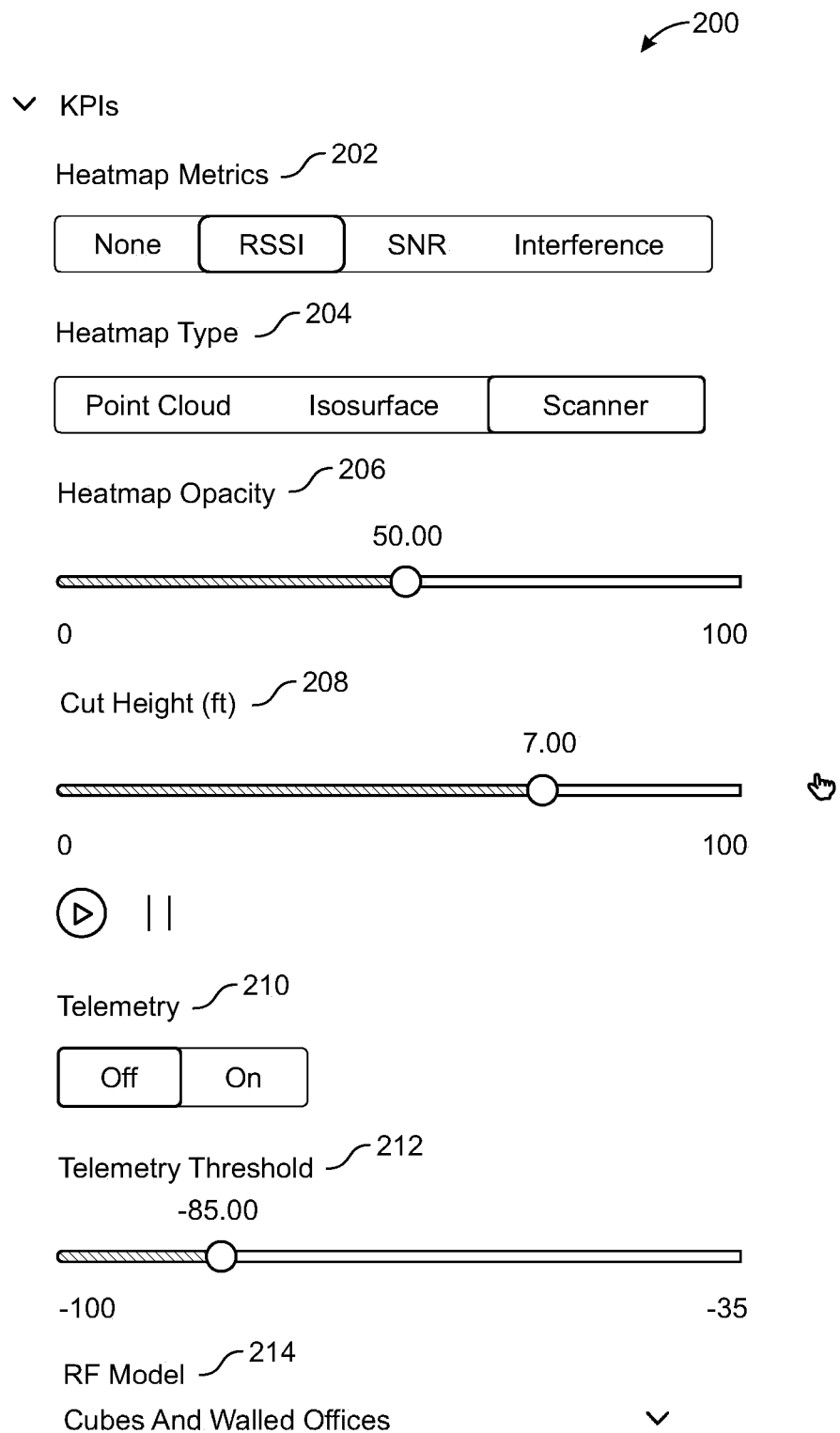
FIG. 4 illustrates an example control menu for a 3-D visualization system according to some aspects of the disclosed technology.

FIG. 4 illustrates an example menu 200 including a list of various parameters that can be adjusted for the 3-D visualization of the wireless signal propagation.

Menu 200 provides an option for key performance indicator (KPI) heatmap metrics 202, for example, none, RSSI, SNR, or Interference. Depending on the selected heatmap metrics, the 3-D visualization of the wireless signal propagation can be presented based on RSSI values, SNR measurements, or interference measurements. RSSI values are a predicted or measured power level at a point in space of an RF transmitted from an AP. Also, SNR measurements are based on the amplitude of signal and noise level. Interference measurements or predictions are based on the power of the interfering signals.

Menu 200 also provides an option for heatmap type 204, for example, point cloud, isosurface, or scanner. A point cloud heatmap provides the 3-D visualization of the wireless signal propagation as a collection of color-coded points where a color variation corresponds to a degree of signal strength. An isosurface heatmap displays the 3-D visualization of the wireless signal propagation with isosurfaces (e.g., contour lines or surfaces) where each isosurface represents points of equal values in a 3-D space. A scanner provides the 3-D visualization of the wireless signal propagation with color-coded bands where the color of the bands corresponds to a degree of signal strength. Also, the scanner allows a user to manipulate a height in the 3-D space, for example, via a height manipulation bar under a cut height 208 so that the wireless signal propagation pattern can be scanned through the 3-D space, for example, from a ground to a ceiling and visualized at varying heights.

Furthermore, a heatmap opacity 206 can be adjusted, for example, in a scale of 0 (i.e., non-transparent) to 100 (i.e., fully transparent) to adjust the transparency of the 3-D visualization.

Also, cut height (ft) 208 can be adjusted, for example, in a scale of 0 to 10. A user can select a particular height where the 3-D visualization is desired. Or, with a play button and a pause button, the 3-D visualization of the wireless signal propagation can be simulated at continuously varying heights from 0 ft to 10 ft.

Menu 200 also provides an option where a visualization of telemetry data 210 can be switched on and off. Also, telemetry threshold 212 can be adjusted, for example, in a scale of −100 to −35.

Furthermore, menu 200 provides an option for a RF Model selection 214. For example, a drop-down list provides various options for the RF model such as cubes and walled offices, drywall offices, or open space.

While not shown in FIG. 4, menu 200 can include different or alternative options. For example, menu 200 could include an option for clipping a 3-D floor plan to take cross-sections of the floor plan to allow clear visualization of an area of interest. Menu 200 could include an adjustable noise floor to be used in calculating a signal-to-noise ratio (SNR). Menu 200 could include an option to change the model of AP being visualized to permit comparisons between various hardware options. Menu 200 could include an option to adjust the frequency band from 2.4 GHz to 5 GHz to visualize attributes associated with RF propagation at those frequencies. The 2.4 GHz band typically provides a greater distance of coverage, while the 5 GHz band typically provides faster communication speeds. Menu 200 can include antennae options that might permit visualizations using directional antennas or omnidirectional antennas. Menu 200 could provide options for adjusting transmission power of an antenna, or a channel. Menu 200 could also provide various sliders for visualizing animations such as a time scale. Accordingly, the menu can provide many options that can vary depending on the type of visualization being presented.

Figure 5:
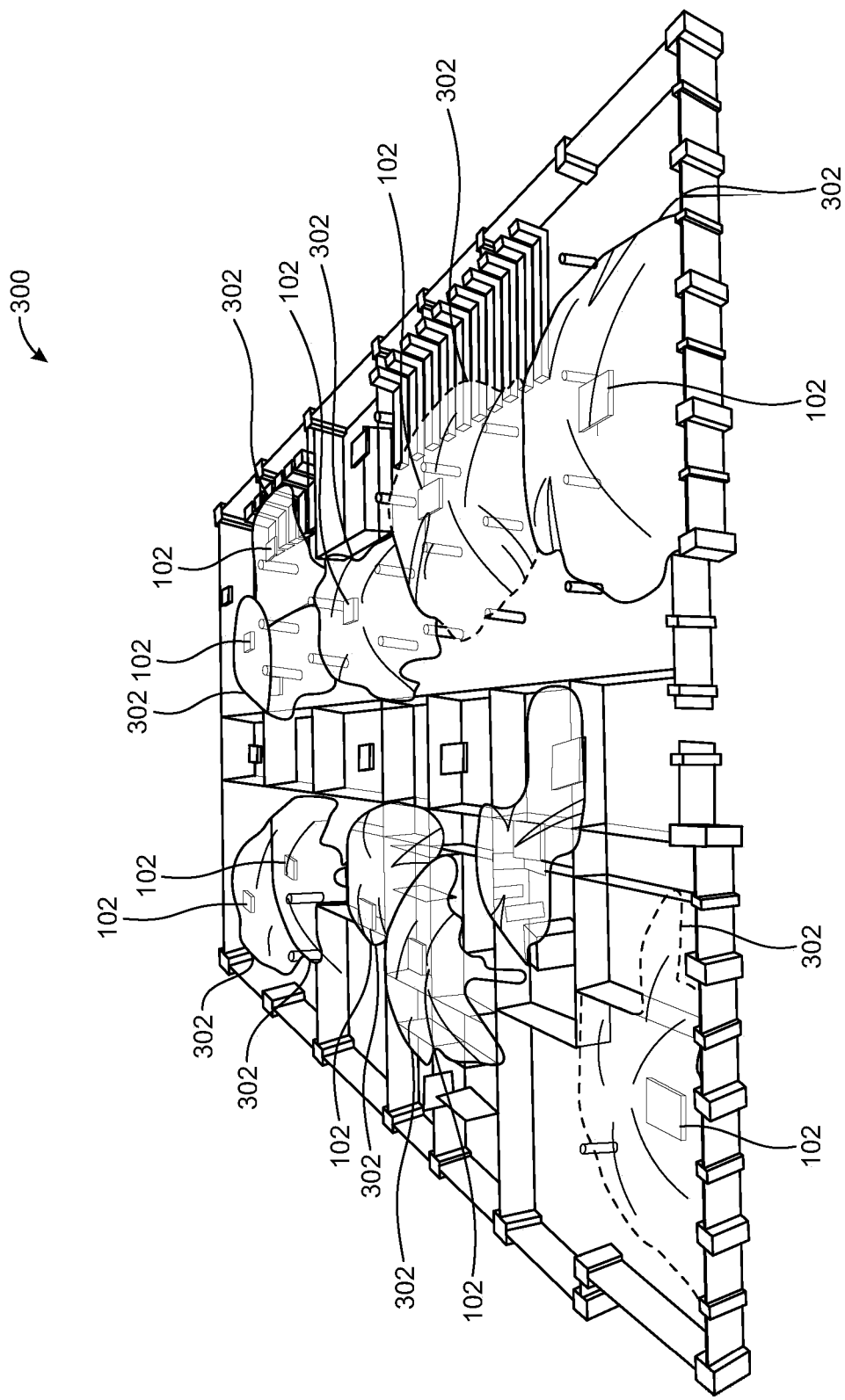
FIG. 5 illustrates an example 3-D visualization of a wireless signal propagation according to some aspects of the disclosed technology.

FIG. 5 illustrates an example 3-D visualization 300 of Wi-Fi AP RF signal propagation. In the 3-D visualization 300, the 3-D visualization of a building plan (e.g., floor plan) is overlaid with RF propagation patterns. As shown in FIG. 5, the 3-D visualization 300 illustrates the RF signal propagation patterns as a collection of zones 302 where each zone represents a service area covered by each AP 102 (e.g., AP 102 illustrated in FIG. 1). Each zone is in the shape of a dome to illustrate a signal strength in the service area in 3-D instead of a simple flat layer in 2-D. Furthermore, the color and size of the domes correspond to a degree of signal strength from the AP in the service area. The dome shape acknowledges that the RF propagation from an AP is not uniform at all heights of a floor plan.

Even though the 3-D visualization 300 of Wi-Fi AP RF signal propagation in FIG. 5 uses a color-coded dome model, the 3-D visualization of the RF signal propagation according to the present disclosure can be provided in the form of a point cloud model, a heat map, or a contour map to illustrate the degree of signal strength in the 3-D space.

Figure 6:
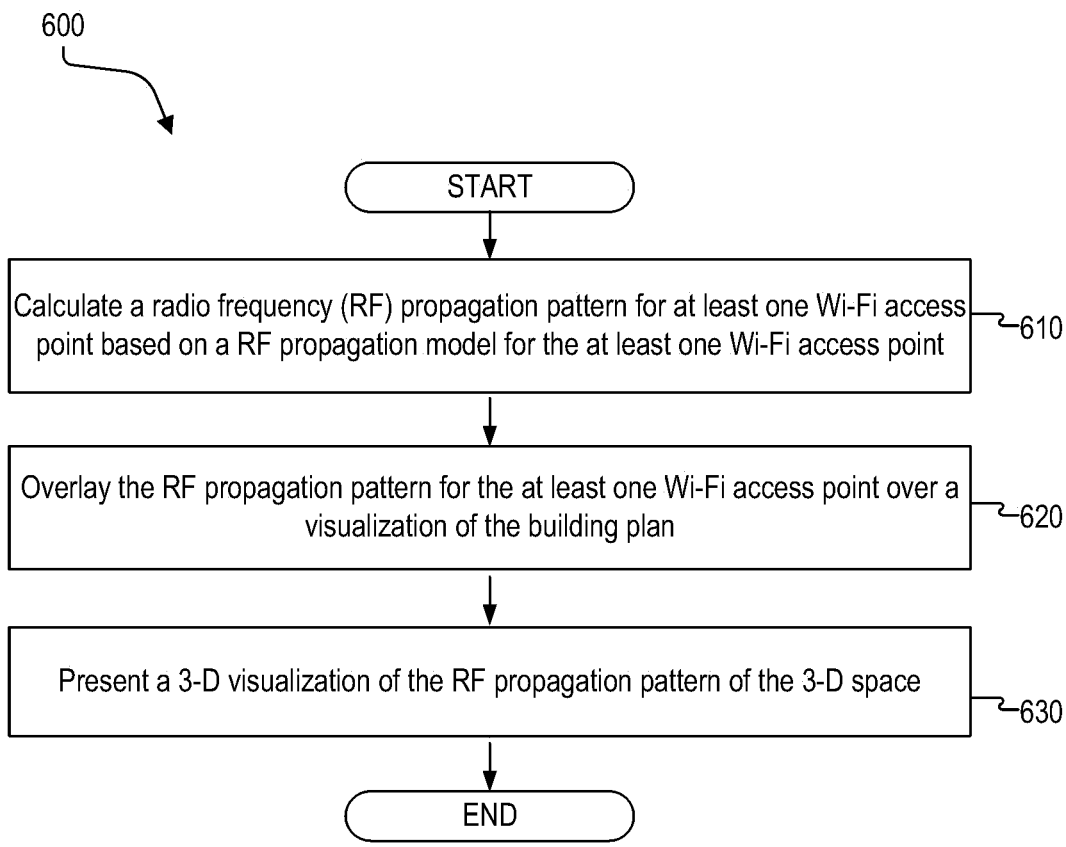
FIG. 6 is a flowchart of a method for providing a 3-D visualization of wireless signal propagation according to an example of the instant disclosure.

FIG. 6 illustrates an example method 600 for visualizing a wireless signal propagation (i.e., RF propagation pattern) in 3-D at various heights and locations. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 includes calculating a RF propagation pattern for at least one Wi-Fi AP based on a RF propagation model for the at least one Wi-Fi AP at block 610. For example, the visualization service 108 illustrated in FIG. 1 may calculate a RF propagation pattern for at least one Wi-Fi AP 102 based on a RF propagation model for the at least one Wi-Fi AP, the antenna pattern of the Wi-Fi AP, the configuration of the Wi-Fi AP (txPower, azimuth angle, elevation, band, and channel), and the geometry of a space as defined in a building plan.

Figure 7:
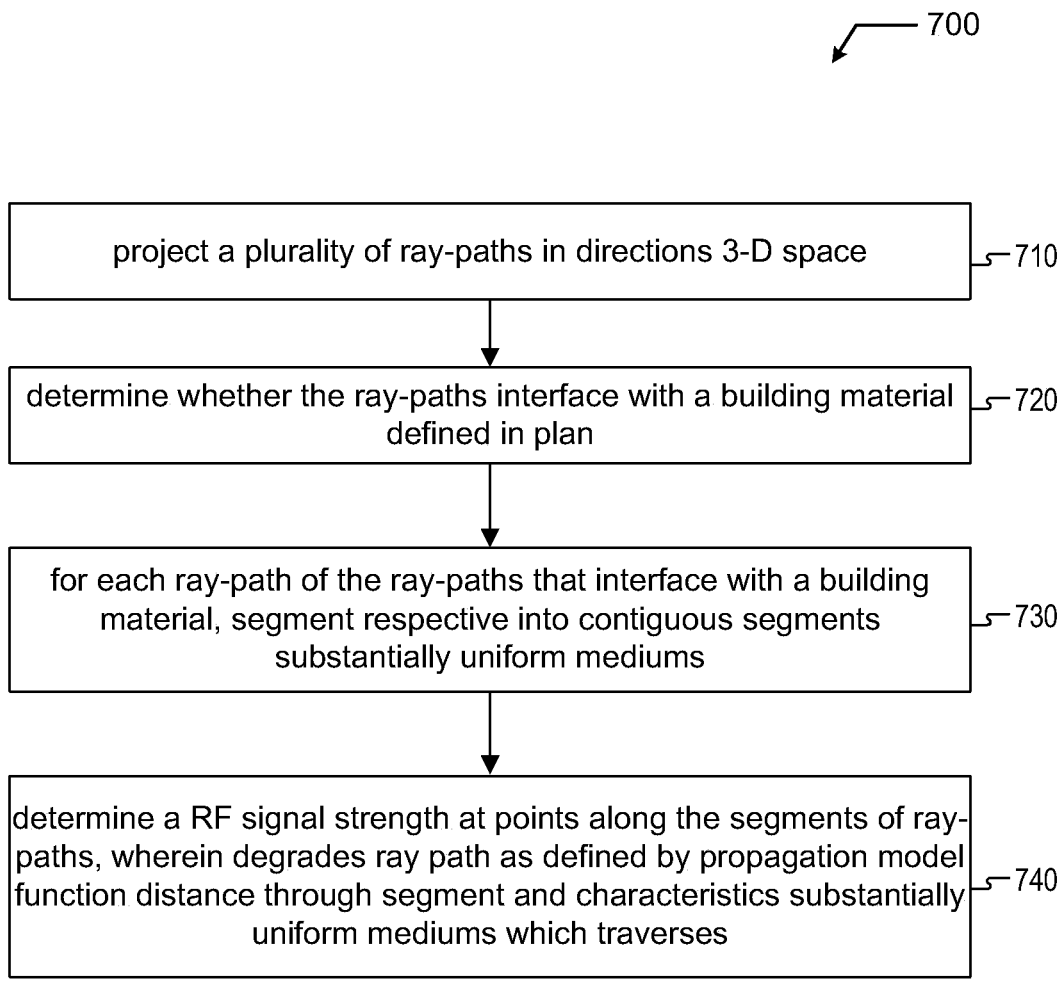
FIG. 7 is a flowchart of an example method for determining a radio frequency (RF) signal strength at points distributed in a 3-D space according to some aspects of the disclosed technology.

An example method 700 for the calculating the 3-D RF propagation pattern is illustrated in FIG. 7. The method 700 includes projecting a plurality of ray-paths in a plurality of directions in a 3-D space at block 710. For example, the ray tracing service 110 illustrated in FIG. 1 may project a plurality of ray-paths in a plurality of directions in a 3-D space. In some embodiments, the ray-paths originate from the Wi-Fi AP and emanate in a variety of X, Y, and Z planes. In some instances, one or more points can be selected in the 3-D space to project the plurality of ray-paths from each of the plurality of APs to the one or more points.

The method 700 includes determining whether the ray-paths interface with a building material defined in a building plan at block 720. For example, the ray tracing service 110 illustrated in FIG. 1 may determine whether the ray-paths interface with a building material defined in a building plan.

The method 700 includes segmenting each ray-path of the ray-paths that interface with a building material the respective ray-path into contiguous segments of substantially uniform mediums at block 730. For example, the ray tracing service 110 illustrated in FIG. 1 may segment the respective ray-path into contiguous segments of substantially uniform mediums.

The ray tracing service 110 can provide the segmented ray paths to an AP model service 106. The combination of the collection of ray paths for any AP and model information from AP model service 106 can be provided to visualization service 108.

The method 700 includes determining a RF signal strength at points along the segments of the ray-paths at block 740. For example, the visualization service 108 illustrated in FIG. 1 may determine a RF signal strength at points along the segments of the ray-paths. The visualization service 108 can use the information about the collection of ray paths for any AP and a RF propagation model particular to the type of AP and the parameters for the specification AP to determine the RF signal strength at points along the segments of the ray-paths. In some embodiments, the signal degrades along the ray path as defined by the RF propagation model as a function of distance through the segment and characteristics of RF propagation pattern through the substantially uniform mediums through which the segment traverses.

In some instances, the determining of the RF signal strength at points can take into account information associated with an antenna, for example, an antenna model (e.g., its premeasured propagation pattern), transmission power, a gain, an angle between each of the ray-paths and the antenna, all of which may affect the RF signal strength.

In some examples, the substantially uniform mediums include open space, concrete, glass, wood, metal, non-metal, glass, liquid, or other materials. Depending on the type of materials, the ray-path interfaces in a differently way, which results in varying RF signal strengths at points along the segments.

Referring to FIG. 6, the method 600 further includes overlaying the RF propagation pattern for the at least one Wi-Fi AP over a visualization of the building plan to present a 3-D visualization of the RF propagation pattern of the 3-D space at block 620. For example, the visualization service 108 illustrated in FIG. 1 may overlay the RF propagation pattern for the at least one Wi-Fi AP over a visualization of the building plan to present a 3-D visualization of the RF propagation pattern of the 3-D space.

In some examples, the overlaying of the RF propagation pattern includes presenting a 3-D volume of one or more spaces where the RF signal strength is lower than a threshold or where a network performance issue is detected. For example, the visualization service 108 illustrated in FIG. 1 may present a 3-D volume of one or more spaces where the RF signal strength is lower than a threshold (i.e., a predetermined limit).

Furthermore, the method 600 includes presenting the 3-D visualization of the RF propagation pattern of the 3-D space at block 630. For example, the visualization service 108 illustrated in FIG. 1 may present the 3-D visualization of the RF propagation pattern of the 3-D space.

In some examples, the 3-D visualization of the Wi-Fi AP RF propagation pattern includes attributes of the Wi-Fi propagation pattern, such as SNR, signal strength, interference, the channel of the APs, etc.

According to some examples, the method 600 include providing one or more suggestions to improve the RF signal strength in one or more areas that may have network performance issue or where the RF signal strength is determined to be lower than a threshold. For example, the troubleshooting service 116 illustrated in FIG. 1 can provide one or more suggestions to increase the RF signal strength in the one or more areas to be over a threshold. In some instances, the one or more suggestions include modifying the building plan or a change in the network configuration (e.g., AP txPower, elevation, azimuth angle, band, frequency, channel).

In some instances, a user interface can be provided to allow a user to adjust the threshold to simulate the change of the RF propagation pattern based on varying thresholds. For example, the user interface service 130 can provide a user with an option to adjust the threshold in which a 3-D volume of areas where the RF signal strength is lower than the threshold can be presented in the 3-D visualization of the RF propagation pattern.

In some examples, the method 600 further includes presenting a simulated visualization of the RF propagation pattern based on the one or more suggestions. For example, the simulation service 120 illustrated in FIG. 1 provides a simulated visualization of the RF propagation pattern based on the one or more suggestions so that a user can observe the improvement in the Wi-Fi coverage or the network performance when the suggestion is applied.

According to some examples, the method 600 comprises receiving input to modify the building plan. For example, the visualization service 108 illustrated in FIG. 1 may receive input to modify the building plan. In some instances, user interface service 130 can allow a user to provide input to modify the building plan.

Further, the method 600 comprises repeating the calculating the RF propagation pattern for the at least one Wi-Fi AP based on the RF propagation model for the at least one Wi-Fi AP based on the modified building plan. For example, the visualization service 108 illustrated in FIG. 1 may repeat the calculation of the RF propagation pattern for the at least one Wi-Fi AP based on the RF propagation model for the at least one Wi-Fi AP based on the modified building plan.

Further, the method 600 comprises presenting the 3-D visualization of the RF propagation pattern based on the modified building plan. For example, the visualization service 108 illustrated in FIG. 1 may present the 3-D visualization of the RF propagation pattern based on the modified building plan.

According to some examples, the method 600 comprises receiving input to modify a configuration of the at least one Wi-Fi AP. For example, the visualization service 108 illustrated in FIG. 1 may receive input to modify a configuration of the at least one Wi-Fi AP. In some instances, user interface service 130 can allow a user to provide input to modify the configuration of the APs.

Further, the method 600 comprises repeating the calculation of the RF propagation pattern for the at least one Wi-Fi AP based on the RF propagation model for the at least one Wi-Fi AP based on the modified configuration of the at least one Wi-Fi AP. For example, the visualization service 108 illustrated in FIG. 1 may repeat the calculate the RF propagation pattern for the at least one Wi-Fi AP based on the RF propagation model for the at least one Wi-Fi AP based on the modified configuration of the at least one Wi-Fi AP.

Further, the method 600 comprises presenting the 3-D visualization of the RF propagation pattern based on the modified configuration of the at least one Wi-Fi AP. For example, the visualization service 108 illustrated in FIG. 1 may present the 3-D visualization of the RF propagation pattern based on the modified configuration of the at least one Wi-Fi AP.

Figure 8A:
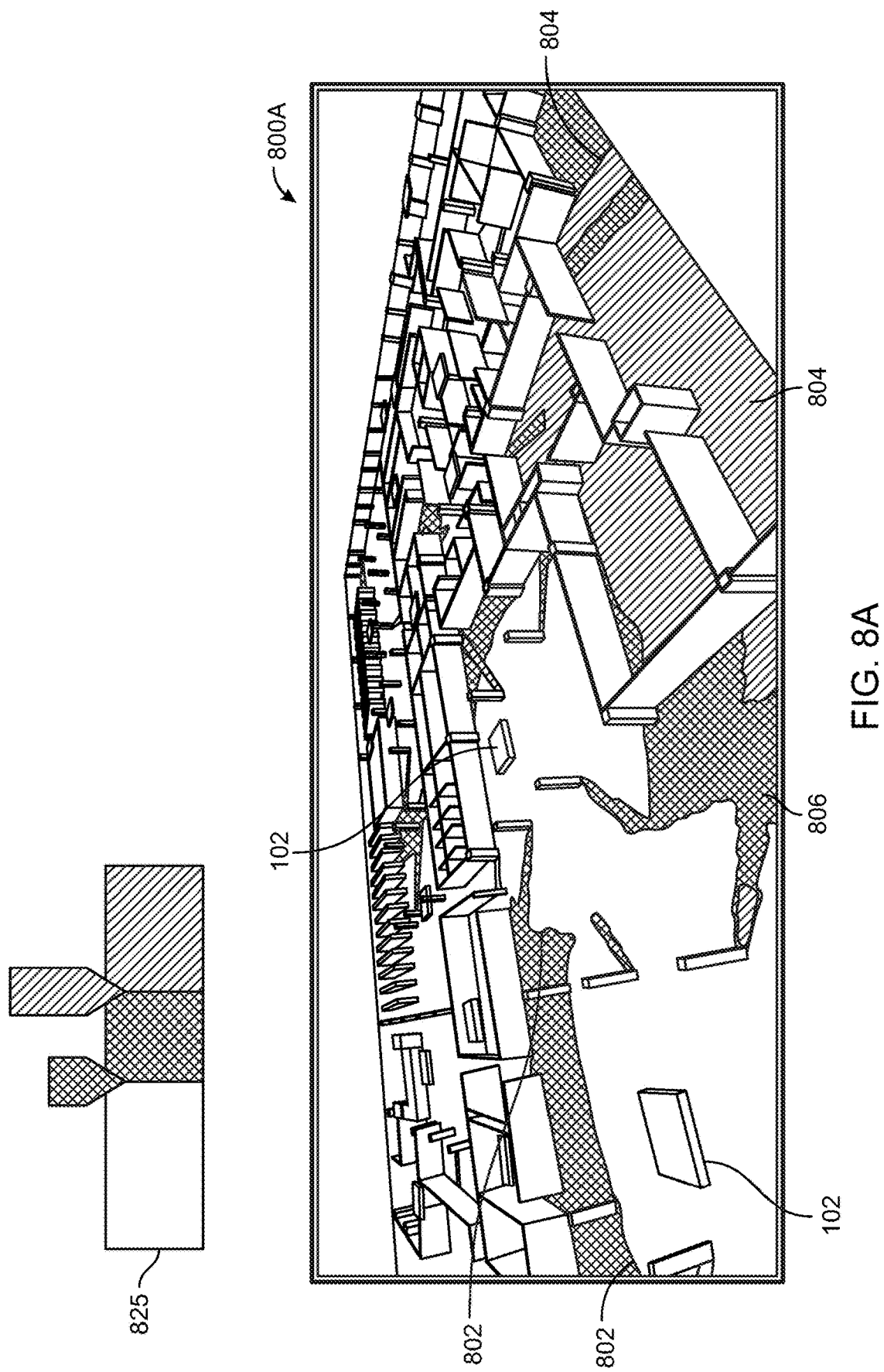

FIGS. 8A and 8B illustrate 3-D visualizations 800A and 800B of RF propagation patterns 802-806 of a plurality of APs 102 in the 3-D space. In some examples, the 3-D visualizations 800A and 800B are determined based on calculations of the RF signal strength at various heights and locations throughout the 3-D space in accordance with the method 700. In the 3-D visualization 800A, the RF propagation patterns at a lower height (i.e., closer to the floor) are shown, while the 3-D visualization 800B shows the RF propagation patterns at a higher height (i.e., closer to the ceiling).

As shown in FIGS. 8A and 8B, the RF propagation patterns at different heights are not measured the same due to the building structure and objects placed at different heights. Instead of predicting a signal propagation at one height and filling an entire 3-D volume uniformly, the present disclosure provides the signal propagation at various heights to take into account objects or obstacles that may be placed at different heights and locations so that a more accurate estimation of the signal propagation in a dynamic network environment can be realized.

In some examples, the RF propagation patterns (e.g., RF propagation patterns 802-806) can be color-coded according to various attributes. For example, an area having a signal strength greater than a first threshold can be illustrated in green 802 (e.g., the RF signal strength greater than −65 dB). An area having a signal strength lower than a second threshold can be illustrated in red 804 (e.g., the RF signal strength lower than −75 dB). Also, an area having a signal strength in between the first and second thresholds can be illustrated in yellow 806 (e.g., the RF signal strength between −75 dB and −65 dB). In some examples, the 3-D visualization includes a user interface 825 that is effective to adjust the signal strength thresholds corresponding to the first threshold and the second threshold.

Figure 9:
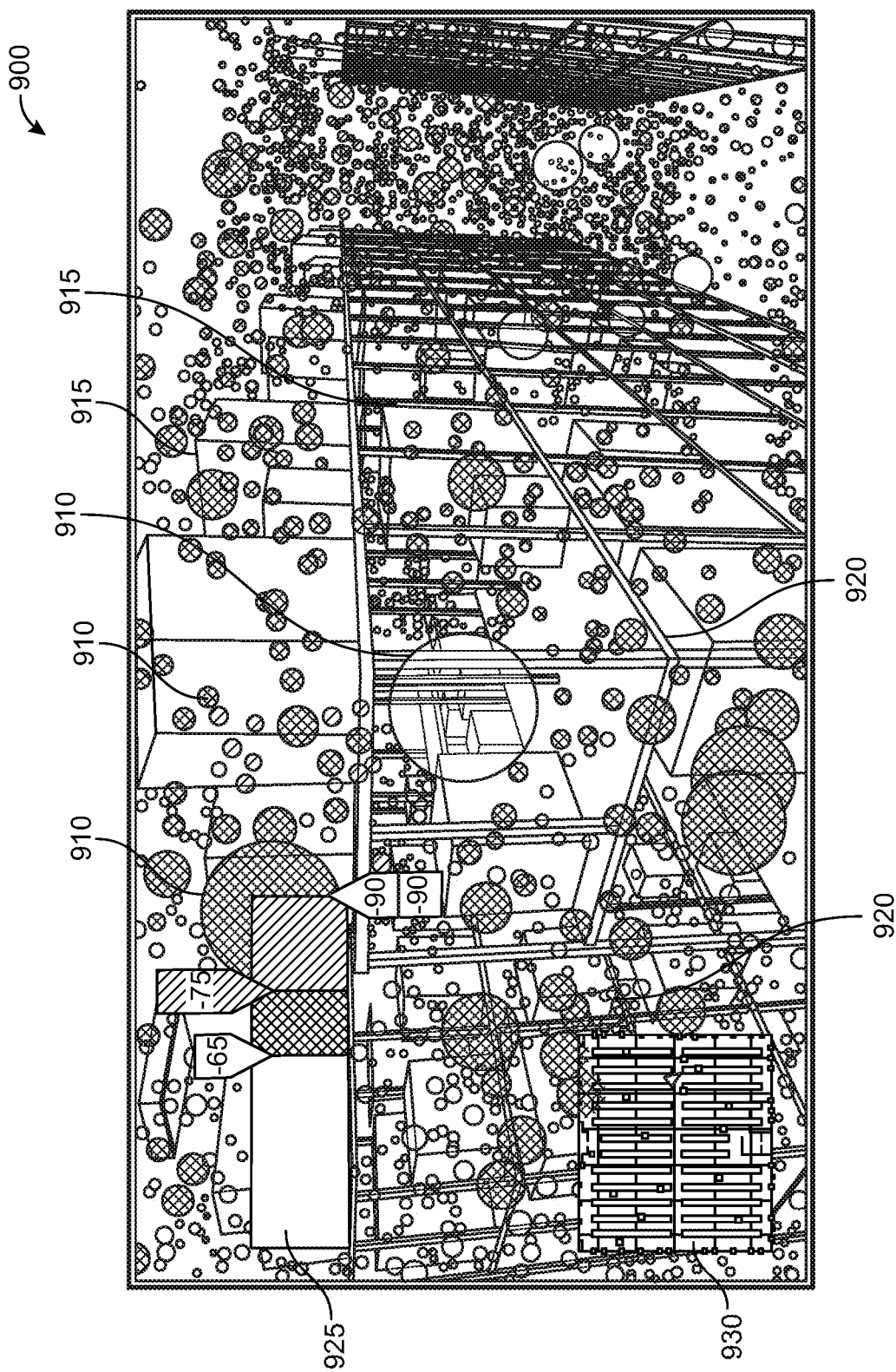
FIG. 9 illustrates an example 3-D visualization showing an RF signal attribute as a point cloud in a first-person perspective view according to some aspects of the disclosed technology.
Figure 10:
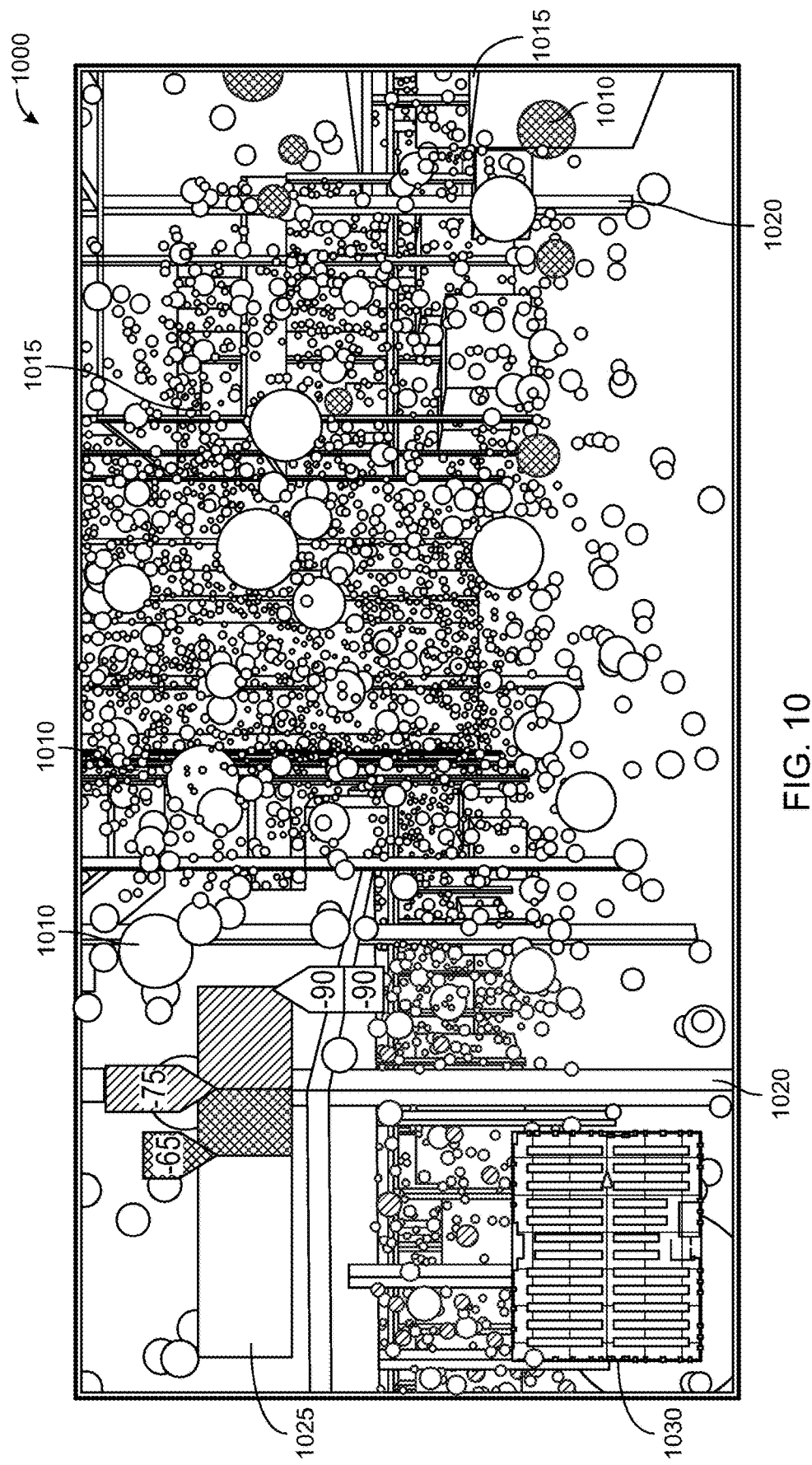
FIG. 10 illustrates an example 3-D visualization showing an RF signal attribute as a point cloud in a ground view according to some aspects of the disclosed technology.

According to some examples, the 3-D visualization of the RF propagation pattern can be provided in various viewpoints such as a first-person perspective view (as shown in FIG. 9), a ground view (as shown in FIG. 10), and an orbit view (e.g., birds eye view). For example, the visualization service 108 illustrated in FIG. 1 provides the 3-D visualizations of the RF propagation pattern in various viewpoints. In some examples, menu 200 as illustrated in FIG. 2 can include an option to select a viewpoint (i.e., how the 3-D visualization is to be displayed) and be presented as a sidebar menu next to the 3-D visualization.

FIG. 9 illustrates a 3-D visualization 900 showing an RF signal attribute as a point cloud in the first-person perspective view. The 3-D visualization 900 displays the RF signal strength overlaid the first-person view of the floorplan including objects placed therein (e.g., boxes 915 or shelving 920).

As illustrated in FIG. 9, the RF signal strength is represented as a collection of points 910 in a point cloud. In some examples, a color code and size of the points 910 correspond to the RF signal strength from an AP at a location of the color-coded points. The points, shapes, and colors acknowledge that the RF propagation from an AP is not uniform at all heights of a floor plan.

Similar to the user interface 825 illustrated in FIGS. 8A and 8B, the 3-D visualization 900 includes a user interface 925 that is effective to adjust the signal strength thresholds determining the color and size of the points 910 in the 3-D visualizations. Depending on the selected thresholds, the signal strength can be represented in corresponding color, size, or pattern.

The 3-D visualization 900 also includes a thumbnail floorplan 930 providing context of the current location where the RF propagation is shown in the floorplan and APs that may be associated with the RF propagation at the current location.

In some instances, the 3-D visualization 900 includes an interactive user interface (not shown) that allows the user to modify the building plan such as placement of shelves, objects on the shelves, materials of the objects placed on the shelves, etc. For example, the user interface service 130 illustrated in FIG. 1 allows the user to adjust the details of the building plan so that the effect of changing building environment on the RF propagation pattern can be simulated in the 3-D visualization. For example, the user can fill the shelves with different types of materials, for example, open space, concrete, glass, wood, metal, non-metal, liquid, or other materials to simulate how the RF propagation pattern changes. Further, the user can change occupancy % for shelving to simulate its effect on the wireless signal strength or coverage. Based on such simulations by modifying the details on the building plan, the user can move around objects within the space to improve the Wi-Fi coverage.

In some examples, the interactive user interface (not shown) can further provide an option to modify the network configuration such as txPower, azimuth angle, elevation, band, antenna orientation, or frequency to simulate the RF propagation to observe different scenarios. For example, the user interface service 130 illustrated in FIG. 1 allows the user to adjust the network configuration (e.g., AP txPower, elevation, azimuth angle, band, frequency, channel).

FIG. 10 illustrates a 3-D visualization 1000 showing an RF signal attribute as a point cloud in a ground view. Similar to FIG. 9, the RF signal strength is represented as a collection of points 1010 in a point cloud in the 3-D visualization

1000. The 3-D visualization 1000 displays the RF signal strength overlaid the first-person view of the floorplan including objects placed therein (e.g., boxes 1015 or shelving 1020). Also, the 3-D visualization 1000 includes a user interface 1025 and a thumbnail floorplan 1030.

In some examples, the at least one Wi-Fi AP is a plurality of Wi-Fi APs, and the 3-D visualization of the RF propagation pattern illustrates RF propagation patterns for the plurality of Wi-Fi APs. For example, the 3-D visualization of the RF propagation patterns for the plurality of W-Fi APs can present a coverage area that overlaps or interference between the RF propagation patterns (e.g., interference from neighboring APs).

Furthermore, when the at least one Wi-Fi AP is a plurality of Wi-Fi APs, the method 600 includes, prior to the overlaying the RF propagation pattern for the plurality of Wi-Fi APs, determining interference of the RF propagation pattern for a first AP of the plurality of Wi-Fi APs with the RF signal strength for a second AP of the plurality of the Wi-Fi APs at any location. For example, the visualization service 108 illustrated in FIG. 1, prior to overlaying the RF propagation for the plurality of Wi-Fi APs, determine interference of the RF propagation pattern between the plurality of the Wi-Fi APs.

In some instances, the method 600 further includes adjusting the RF signal strength for the second AP along the segments of the ray-path on the interference. For example, the visualization service 108 illustrated in FIG. 1 may adjust the RF signal strength to take into account for the interference from another Wi-Fi AP.

In some examples, the neighboring APs can be located on the same floor or a different floor of the building plan.

Figure 11:
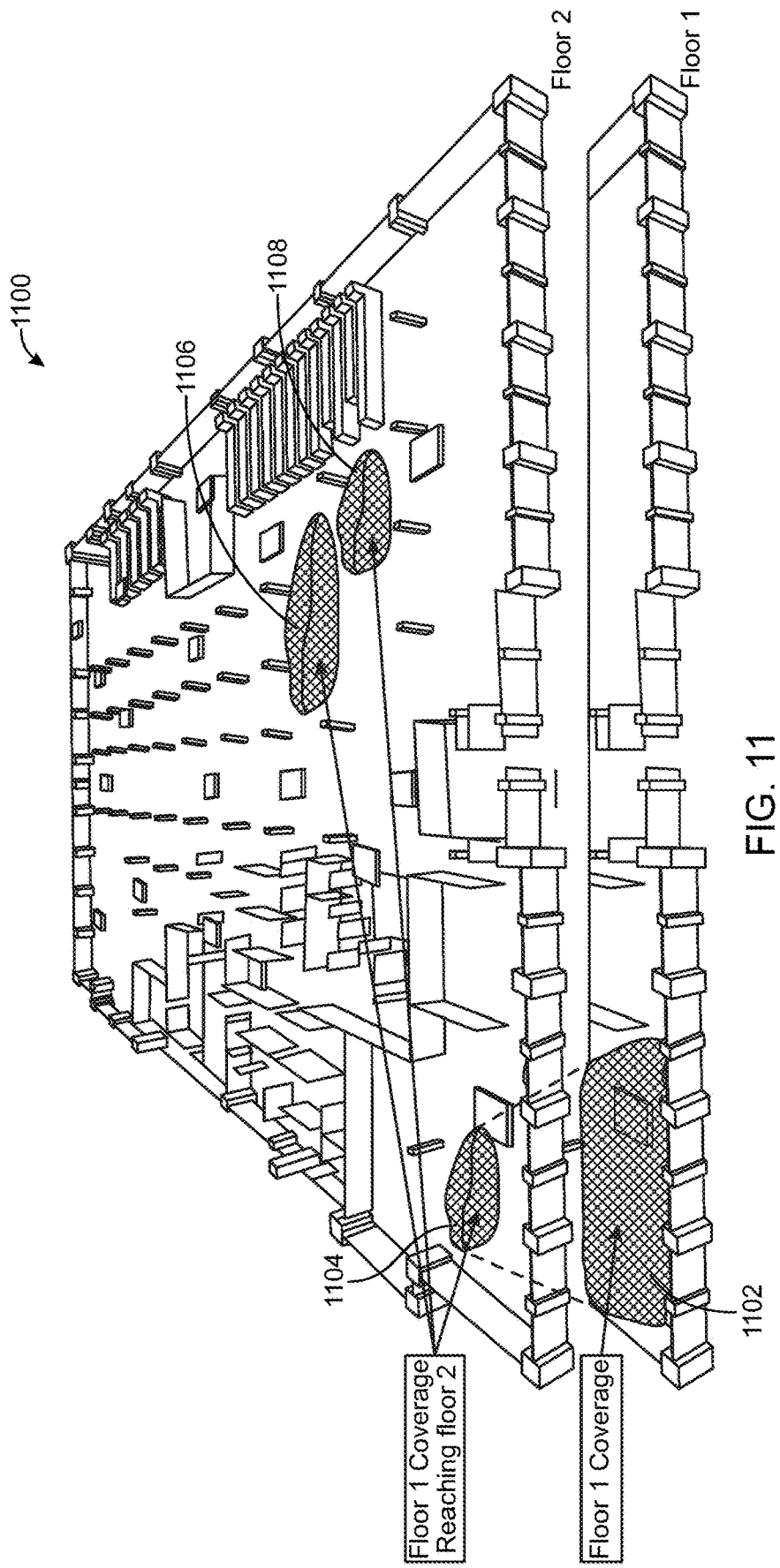
FIG. 11 illustrates an example 3-D visualization of wireless signal propagation through multiple floors according to some aspects of the disclosed technology.

Referring to FIG. 11, the 3-D visualization 1100 shows the RF propagation patterns 1102-1108 through multiple floors (e.g., Floor 1 and Floor 2). In some examples, when the building plan includes multiple floors and the at least one Wi-Fi AP is located on a first floor, the method 600 further includes including a view of an area on a second floor and displaying a portion of the RF propagation pattern that overlaps with the area on the second floor. For example, the RF propagation pattern 1102 of the AP 102 located on Floor 1 reaches Floor 2 and provides a coverage 1104 on Floor 2. Also, the RF propagation patterns 1106 and 1108 can be identified in the 3-D visualization 1100 as a coverage area projected from Floor 1.

In some examples, the method 600 comprises determining a condition or status of the at least one Wi-Fi AP and providing information associated with a relationship between the RF propagation pattern (e.g. Wi-Fi coverage) and expected quality of services (QoS) based on the condition or status of the at least one Wi-Fi AP. In some instances, the condition or status of the at least one Wi-Fi AP can be quantified such as a health score. For example, the Wi-Fi 3-D analyzer 180 illustrated in FIG. 2 can determine a condition or status of the at least one Wi-Fi AP 102 and provide information associated with a relationship between the RF propagation pattern (e.g., Wi-Fi coverage) and expected QoS based on the condition or status of the at least one Wi-Fi AP 102.

For example, if an over-the-air environment in one area has high utilization (e.g., high traffic), client devices in the area cannot receive a high QoS even if they are located physically close to an AP. Similarly, if an AP has memory leakage or has exhausted its available memory, the AP will keep dropping client devices and packets even if the client devices are within a good RF coverage.

According to some examples, the method 600 comprises receiving product information of the at least one Wi-Fi AP. For example, new the visualization service 108 illustrated in FIG. 1 may receive product information of the at least one Wi-Fi AP. For example, the product information can include end-of-life information of the at least one Wi-Fi AP. For example, new product information and life cycle data can be obtained from sales tools 160 as illustrated in FIG. 2 and transmitted to wireless controller 170 and to Wi-Fi 3-D analyzer 180 as illustrated in FIG. 2. Further, the method 600 includes providing one or more proposals to upgrade the at least one Wi-Fi AP based on the product information. For example, the optimization service 118 illustrated in FIG. 1 provides one or more proposals to upgrade the at least one Wi-Fi AP to improve the network performance. Alternatively, the Wi-Fi 3-D analyzer 180 can provide upgrade proposals 166 to the user 190 as shown in FIG. 2.

In some examples, the upgrade proposals can take into account historical trends pertaining to client device density, typical client on-boarding time, typical client roaming time. Also, According to some examples, the method 600 comprises receiving assurance data associated with access class information of the at least one Wi-Fi AP. For example, the visualization service 108 illustrated in FIG. 1 may receive assurance data associated with access class information of the at least one Wi-Fi AP. Further, the method 600 includes providing access class information in the visualization of the RF propagation pattern of the at least one Wi-Fi AP. For example, the visualization service 108 illustrated in FIG. 1 provides access class information in the 3-D visualization of the RF propagation pattern of the at least one Wi-Fi AP. In some instances, access class information can include the most used service type on a specific AP, for example, voice, video, best effort, or background. Also, by correlating the access class information with latency measurements, AP service areas with possible service quality issues can be detected and visualized.

According to some examples, the method 600 comprises masking one or more portions of the 3-D visualization of the RF propagation pattern that are outside of the building plan or obscured by one or more walls in the building plan. For example, the visualization service 108 illustrated in FIG. 1 may mask one or more portions of the 3-D visualization of the RF propagation pattern that are outside of the building plan or obscured by one or more walls in the building plan, for example a desk or other furniture or other objects that exist in the physical space that may not present on the building plan.

Figure 12A:
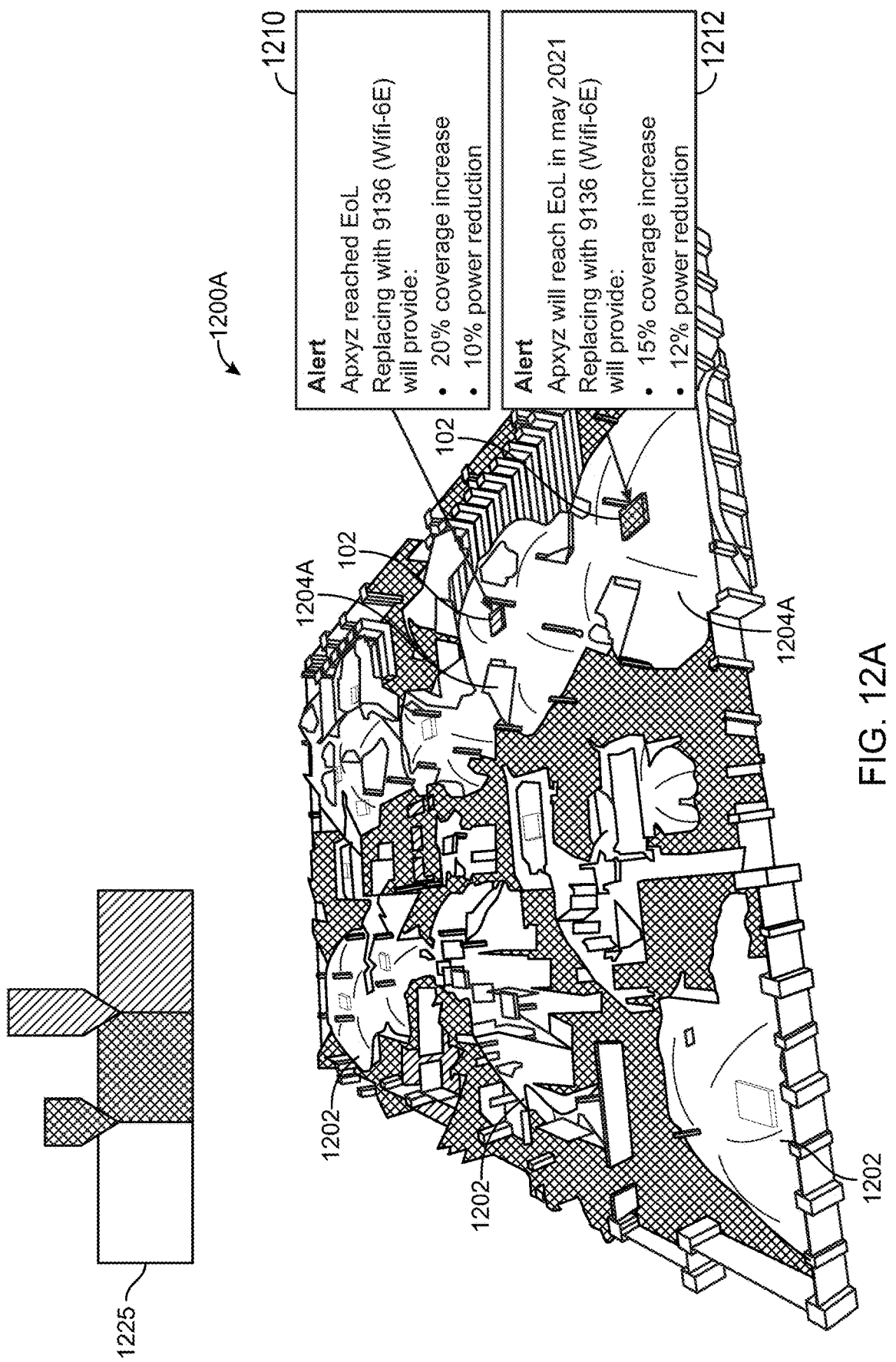
FIGS. 12A and 12B illustrate example 3-D visualizations of a wireless signal propagation including analysis of an issue and providing proposals according to some aspects of the disclosed technology.
Figure 12B:
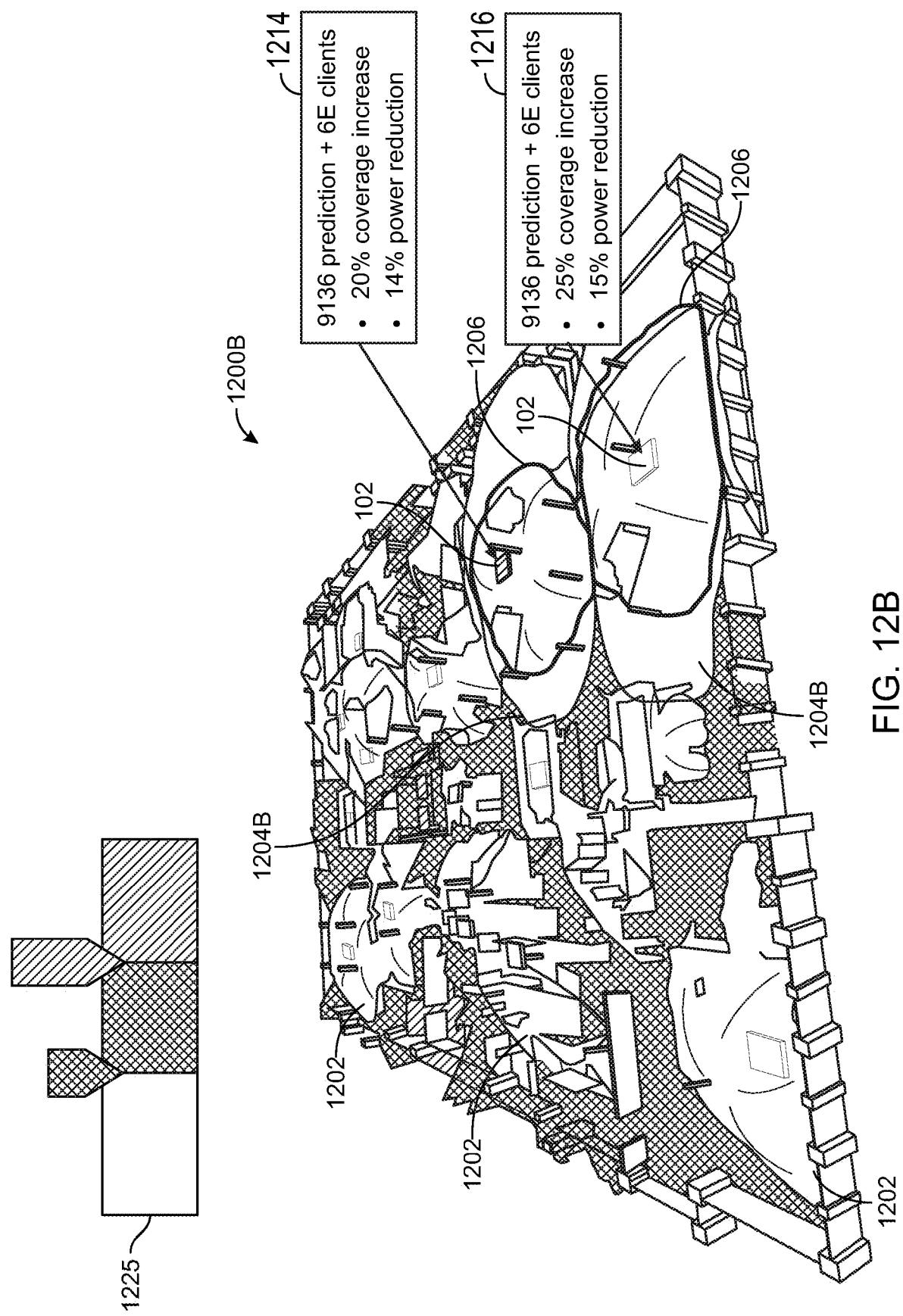

Further, the method 600 comprises providing one or more proposals to upgrade the at least one Wi-Fi AP. For example, the visualization service 108 illustrated in FIG. 1 may provide one or more proposals to upgrade the at least one Wi-Fi AP in the 3-D visualization. Referring to FIGS. 12A and 12B, the 3-D visualizations 1200A and 1200B of a wireless signal propagation include analysis of an issue (e.g., alerts) 1210 and 1212 and providing proposals 1214 and 1216 according to some aspects of the disclosed technology.

In some examples, the 3-D visualizations 1200A and 1200B comprise a user interface 1225, which is configured to adjust the signal strength thresholds determining the pattern or color of the wireless coverage in the 3-D visualizations 1200A and 1200B. Also, the 3-D visualizations 1200A and 1200B can be partitioned into one or more regions based on the signal strength thresholds determined by the user interface 1225. For example, first regions 1202 have strong signal strength. While second regions 1204A have strong signal strength, the 3-D visualization 1200A can provide alerts 1210 and 1212 related to the respective AP 102 so that the wireless coverage can be further improved.

According to some examples, the 3-D visualization 1200A of the RF propagation pattern can include alerts 1210 and 1212 associated with the respective AP 102. For example, alerts 1210 and 1212 can provide the status of the respective AP 102, for example, end-of-life (EoL). In some examples, the 3-D visualization 1200A of the RF propagation pattern can provide a visual identifier to show an AP that may have a network performance issue. When such AP is selected in the 3-D visualization, the 3-D visualization 1200A can provide information identifying the issue and possible upgrade that can improve the network performance.

In some instances, the 3-D visualization 1200B can show the simulation of the RF propagation pattern based on the proposals, for example, improved coverage or capacity based on the proposed upgrade. In FIG. 12B, a boundary 1206 represents the previous wireless signal coverage (e.g., second regions 1204A) and expanded regions 1204B show that the wireless signal coverage has been improved and expanded to cover more area. As illustrated in FIG. 12B, the proposals 1214 and 1216 include possible upgrade (e.g., upgrade to Wi-Fi 6/6E) or suggestions to improve the network performance and impact of such suggestions (e.g., amount of coverage increase or power reduction). This way the user can visualize the impact of the recommended upgrade proposals.

In some examples, in response to receiving a selection of a particular AP, for example, via user interface service 130 as illustrated in FIG. 1, the visualization service 108 can present statistics and information pertaining to the particular AP. For example, the statistics and information can include wireless signal strength, channel associated with the AP, interference impact, access class information, etc.

In some instances, a menu (e.g., the menu 200 illustrated in FIG. 4) can be presented as a sidebar menu next to the 3-D visualization 1200A and 1200B. The menu can provide information about the AP and can receive user inputs to modify some parameters or configurations of the APs, the building plan, or the 3-D visualization.

Figure 13:
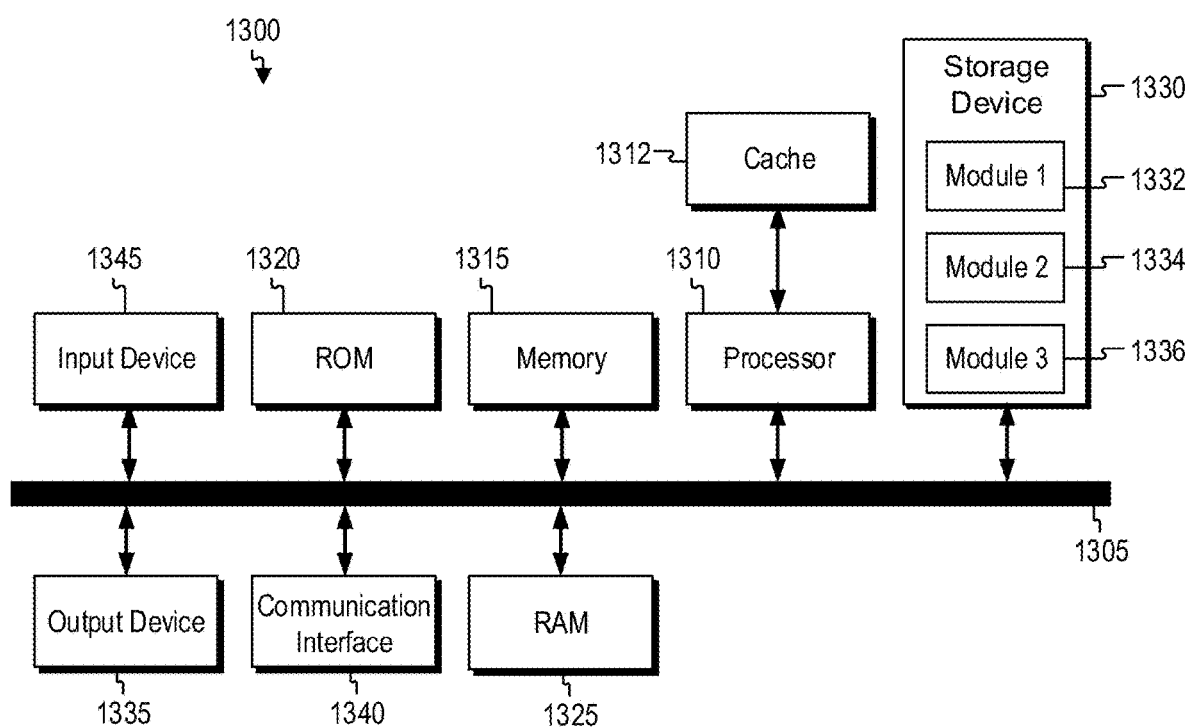
FIG. 13 shows an example computing system, which can be for example any computing device that can implement components of the system.

FIG. 13 shows an example of computing system 1300, which can be for example any computing device making up 3-D signal propagation visualization system 100, or any component thereof in which the components of the system are in communication with each other using connection 1305. Connection 1305 can be a physical connection via a bus, or a direct connection into processor 1310, such as in a chipset architecture. Connection 1305 can also be a virtual connection, networked connection, or logical connection.

In some embodiments computing system 1300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read only memory (ROM) 1320 and random access memory (RAM) 1325 to processor 1310. Computing system 1300 can include a cache of high-speed memory 1312 connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms known to those of skill in the art. In some instances, multimodal systems can enable a user to provide multiple types of input/output to communicate with computing system 1300. Computing system 1300 can include communications interface 1340, which can generally govern and manage the user input and system output. There is no restriction on operating on any particular hardware arrangement and therefore the basic features here may easily be substituted for improved hardware or firmware arrangements as they are developed.

Storage device 1330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1: A method of visualizing a Wi-Fi access point radio frequency (RF) propagation pattern in three-dimensional (3-D), the method comprising: calculating a radio frequency (RF) propagation pattern for at least one Wi-Fi access point based on a RF propagation model for the at least one Wi-Fi access point, the calculating including: projecting a plurality of ray-paths in a plurality of directions in a 3-D space, wherein the ray-paths originate from the at least one Wi-Fi access point and emanate in a variety of X, Y, and Z planes; determining whether the ray-paths interface with one or more objects defined in a building plan; for each ray-path of the ray-paths that interface with the one or more objects defined in the building plan, segmenting the respective ray-path into contiguous segments of substantially uniform mediums; and determining a RF signal strength at points along the contiguous segments of the ray-paths, wherein the RF signal strength degrades along the contiguous segments of the ray-paths as defined by the RF propagation model as a function of distance through the contiguous segments and characteristics of the RF propagation pattern through the substantially uniform mediums through which the segment traverses; and overlaying the RF propagation pattern for the at least one Wi-Fi access point over a visualization of the building plan to present a 3-D visualization of the RF propagation pattern of the 3-D space.

Aspect 2: The method of Aspect 1, wherein the substantially uniform mediums include open space, concrete, glass, wood, metal, non-metal, liquid, or other materials.

Aspect 3: The method of any of Aspects 1 to 2, wherein the overlaying of the RF propagation pattern includes displaying the RF propagation pattern as a plurality of color-coded points, wherein a color code corresponds to the RF signal strength at a location of the color-coded points.

Aspect 4: The method of any of Aspects 1 to 3, wherein the overlaying of the RF propagation pattern includes presenting a 3-D volume of one or more areas where the RF signal strength is lower than a threshold.

Aspect 5: The method of any of Aspects 1 to 4, the method further comprising: providing one or more suggestions to increase the RF signal strength in the one or more areas over the threshold.

Aspect 6: The method of any of Aspects 1 to 5, the method further comprising: presenting a simulated visualization of the RF propagation pattern based on the one or more suggestions.

Aspect 7: The method of any of Aspects 1 to 6, further comprising: receiving input to modify the building plan; repeating the calculating the RF propagation pattern for the at least one Wi-Fi access point based on the RF propagation model for the at least one Wi-Fi access point based on the modified building plan; and presenting the 3-D visualization of the RF propagation pattern based on the modified building plan.

Aspect 8: The method of any of Aspects 1 to 7, further comprising: receiving input to modify a configuration of the at least one Wi-Fi access point; repeating the calculating the RF propagation pattern for the at least one Wi-Fi access point based on the RF propagation model for the at least one Wi-Fi access point based on the modified configuration of the at least one Wi-Fi access point; and presenting the 3-D visualization of the RF propagation pattern based on the modified configuration of the at least one Wi-Fi access point.

Aspect 9: The method of any of Aspects 1 to 8, further comprising: determining a point of view of the 3-D visualization of the RF propagation pattern.

Aspect 10: The method of any of Aspects 1 to 9, wherein the building plan includes multiple floors and the at least one Wi-Fi access point is located on a first floor, the method further comprising: including a view of an area on a second floor; and displaying a portion of the RF propagation pattern that overlaps with the area on the second floor.

Aspect 11: The method of any of Aspects 1 to 10, wherein the point of view of the 3-D visualization of the RF propagation pattern includes a view of the area on the second floor.

Aspect 12: The method of any of Aspects 1 to 11, wherein the at least one Wi-Fi access point is a plurality of Wi-Fi access points, the method further comprising: prior to the overlaying the RF propagation pattern for the plurality of Wi-Fi access points, determining interference of the RF propagation pattern for a first access point of the plurality of Wi-Fi access points with the RF signal strength for a second access point of the plurality of the Wi-Fi access points at any location; and adjusting the RF signal strength for the second access point along the segments of the ray-path based on the interference.

Aspect 13: The method of any of Aspects 1 to 12, wherein the first access point is located on a different floor of the building plan than the second access point.

Aspect 14: The method of any of Aspects 1 to 13, further comprising: receiving product information of the at least one Wi-Fi access point; and providing one or more proposals to upgrade the at least one Wi-Fi access point.

Aspect 15: The method of any of Aspects 1 to 14, further comprising: receiving assurance data associated with access class information of the at least one Wi-Fi access point; and providing the access class information in the visualization of the RF propagation pattern of the at least one Wi-Fi access point.

Aspect 16: The method of any of Aspects 1 to 15, further comprising: masking one or more portions of the 3-D visualization of the RF propagation pattern that are outside of the building plan or obscured by one or more walls in the building plan.

Aspect 17: A system for visualizing a Wi-Fi access point RF propagation pattern in 3-D, comprising: a storage configured to store instructions; a processor configured to execute the instructions and cause the processor to: calculate a radio frequency (RF) propagation pattern for at least one Wi-Fi access point based on a RF propagation model for the at least one Wi-Fi access point, the calculating including, projecting a plurality of ray-paths in a plurality of directions in a 3-D space, wherein the ray-paths originate from the at least one Wi-Fi access point and emanate in a variety of X, Y, and Z planes, determining whether the ray-paths interface with one or more objects defined in a building plan, for each ray-path of the ray-paths that interface with the one or more objects defined in the building plan, segmenting the respective ray-path into contiguous segments of substantially uniform mediums, and determining a RF signal strength at points along the contiguous segments of the ray-paths, wherein the RF signal strength degrades along the contiguous segments of the ray-paths as defined by the RF propagation model as a function of distance through the contiguous segments and characteristics of the RF propagation pattern through the substantially uniform mediums through which the segment traverses, and overlay the RF propagation pattern for the at least one Wi-Fi access point over a visualization of the building plan to present a 3-D visualization of the RF propagation pattern of the 3-D space.

Aspect 18: The system of Aspect 17, wherein the substantially uniform mediums include open space, concrete, glass, wood, metal, non-metal, liquid, or other materials.

Aspect 19: The system of any of Aspects 17 to 18, wherein the overlaying of the RF propagation pattern includes displaying the RF propagation pattern as a plurality of color-coded points and the overlaying of the RF propagation pattern includes displaying the RF propagation pattern as a plurality of color-coded points.

Aspect 20: The system of any of Aspects 17 to 19, wherein the overlaying of the RF propagation pattern includes presenting a 3-D volume of one or more areas where the RF signal strength is lower than a threshold.

Aspect 21: The system of any of Aspects 17 to 20, wherein the processor is configured to execute the instructions and cause the processor to: provide one or more suggestions to increase the RF signal strength in the one or more areas over the threshold.

Aspect 22: The system of any of Aspects 17 to 21, wherein the processor is configured to execute the instructions and cause the processor to: present a simulated visualization of the RF propagation pattern based on the one or more suggestions.

Aspect 23: The system of any of Aspects 17 to 22, wherein the processor is configured to execute the instructions and cause the processor to: receive input to modify the building plan; repeat the calculate the RF propagation pattern for the at least one Wi-Fi access point based on the RF propagation model for the at least one Wi-Fi access point based on the modified building plan; and present the 3-D visualization of the RF propagation pattern based on the modified building plan.

Aspect 24: The system of any of Aspects 17 to 23, wherein the processor is configured to execute the instructions and cause the processor to: receive input to modify a configuration of the at least one Wi-Fi access point; repeat the calculate the RF propagation pattern for the at least one Wi-Fi access point based on the RF propagation model for the at least one Wi-Fi access point based on the modified configuration of the at least one Wi-Fi access point; and present the 3-D visualization of the RF propagation pattern based on the modified configuration of the at least one Wi-Fi access point.

Aspect 25: The system of any of Aspects 17 to 24, wherein the processor is configured to execute the instructions and cause the processor to: determine a point of view of the 3-D visualization of the RF propagation pattern.

Aspect 26: The system of any of Aspects 17 to 25, wherein the processor is configured to execute the instructions and cause the processor to: include a view of an area on a second floor; and display a portion of the RF propagation pattern that overlaps with the area on the second floor.

Aspect 27: The system of any of Aspects 17 to 26, wherein the point of view of the 3-D visualization of the RF propagation pattern includes a view of the area on the second floor.

Aspect 28: The system of any of Aspects 17 to 27, wherein the processor is configured to execute the instructions and cause the processor to: prior to the overlaying the RF propagation pattern for the plurality of Wi-Fi access points, determine interference of the RF propagation pattern for a first access point of the plurality of Wi-Fi access points with the RF signal strength for a second access point of the plurality of the Wi-Fi access points at any location; and adjust the RF signal strength for the second access point along the segments of the ray-path based on the interference.

Aspect 29: The system of any of Aspects 17 to 28, wherein the first access point is located on a different floor of the building plan than the second access point.

Aspect 30: The system of any of Aspects 17 to 29, wherein the processor is configured to execute the instructions and cause the processor to: receive product information of the at least one Wi-Fi access point; and provide one or more proposals to upgrade the at least one Wi-Fi access point.

Aspect 31: The system of any of Aspects 17 to 30, wherein the processor is configured to execute the instructions and cause the processor to: receive assurance data associated with access class information of the at least one Wi-Fi access point; and provide the access class information in the visualization of the RF propagation pattern of the at least one Wi-Fi access point.

Aspect 32: The system of any of Aspects 17 to 31, wherein the processor is configured to execute the instructions and cause the processor to: mask one or more portions of the 3-D visualization of the RF propagation pattern that are outside of the building plan or obscured by one or more walls in the building plan.

Aspect 33: A non-transitory computer readable medium comprising instructions, the instructions, when executed by a computing system, cause the computing system to: calculate a radio frequency (RF) propagation pattern for at least one Wi-Fi access point based on a RF propagation model for the at least one Wi-Fi access point, the calculating of the RF propagation pattern including; projecting a plurality of ray-paths in a plurality of directions in a 3-D space, wherein the ray-paths originate from the at least one Wi-Fi access point and emanate in a variety of X, Y, and Z planes; determining whether the ray-paths interface with one or more objects defined in a building plan; for each ray-path of the ray-paths that interface with the one or more objects defined in the building plan, segmenting the respective ray-path into contiguous segments of substantially uniform mediums; and determining a RF signal strength at points along the contiguous segments of the ray-paths, wherein the RF signal strength degrades along the contiguous segments of the ray-paths as defined by the RF propagation model as a function of distance through the contiguous segments and characteristics of the RF propagation pattern through the substantially uniform mediums through which the segment traverses; and overlay the RF propagation pattern for the at least one Wi-Fi access point over a visualization of the building plan to present a 3-D visualization of the RF propagation pattern of the 3-D space.

Aspect 34: The computer readable medium of Aspect 33, the substantially uniform mediums include open space, concrete, glass, wood, metal, non-metal, liquid, or other materials.

Aspect 35: The computer readable medium of any of Aspects 33 to 34, the overlaying of the RF propagation pattern includes displaying the RF propagation pattern as a plurality of color-coded points and the overlaying of the RF propagation pattern includes displaying the RF propagation pattern as a plurality of color-coded points.

Aspect 36: The computer readable medium of any of Aspects 33 to 35, the overlaying of the RF propagation pattern includes presenting a 3-D volume of one or more areas where the RF signal strength is lower than a threshold.

Aspect 37: The computer readable medium of any of Aspects 33 to 36, wherein the computer readable medium further comprises instructions that, when executed by the computing system, cause the computing system to: provide one or more suggestions to increase the RF signal strength in the one or more areas over the threshold.

Aspect 38: The computer readable medium of any of Aspects 33 to 37, wherein the computer readable medium further comprises instructions that, when executed by the computing system, cause the computing system to: present a simulated visualization of the RF propagation pattern based on the one or more suggestions.

Aspect 39: The computer readable medium of any of Aspects 33 to 38, wherein the computer readable medium further comprises instructions that, when executed by the computing system, cause the computing system to: receive input to modify the building plan; repeat the calculate the RF propagation pattern for the at least one Wi-Fi access point based on the RF propagation model for the at least one Wi-Fi access point based on the modified building plan; and present the 3-D visualization of the RF propagation pattern based on the modified building plan.

Aspect 40: The computer readable medium of any of Aspects 33 to 39, wherein the computer readable medium further comprises instructions that, when executed by the computing system, cause the computing system to: receive input to modify a configuration of the at least one Wi-Fi access point; repeat the calculate the RF propagation pattern for the at least one Wi-Fi access point based on the RF propagation model for the at least one Wi-Fi access point based on the modified configuration of the at least one Wi-Fi access point; and present the 3-D visualization of the RF propagation pattern based on the modified configuration of the at least one Wi-Fi access point.

Aspect 41: The computer readable medium of any of Aspects 33 to 40, wherein the computer readable medium further comprises instructions that, when executed by the computing system, cause the computing system to: determine a point of view of the 3-D visualization of the RF propagation pattern.

Aspect 42: The computer readable medium of any of Aspects 33 to 41, wherein the computer readable medium further comprises instructions that, when executed by the computing system, cause the computing system to: include a view of an area on a second floor; and display a portion of the RF propagation pattern that overlaps with the area on the second floor.

Aspect 43: The computer readable medium of any of Aspects 33 to 42, the point of view of the 3-D visualization of the RF propagation pattern includes a view of the area on the second floor.

Aspect 44: The computer readable medium of any of Aspects 33 to 43, wherein the computer readable medium further comprises instructions that, when executed by the computing system, cause the computing system to: prior to the overlaying the RF propagation pattern for the plurality of Wi-Fi access points, determine interference of the RF propagation pattern for a first access point of the plurality of Wi-Fi access points with the RF signal strength for a second access point of the plurality of the Wi-Fi access points at any location; and adjust the RF signal strength for the second access point along the segments of the ray-path based on the interference.

Aspect 45: The computer readable medium of any of Aspects 33 to 44, the first access point is located on a different floor of the building plan than the second access point.

Aspect 46: The computer readable medium of any of Aspects 33 to 45, wherein the computer readable medium further comprises instructions that, when executed by the computing system, cause the computing system to: receive product information of the at least one Wi-Fi access point; and provide one or more proposals to upgrade the at least one Wi-Fi access point.

Aspect 47: The computer readable medium of any of Aspects 33 to 46, wherein the computer readable medium further comprises instructions that, when executed by the computing system, cause the computing system to: receive assurance data associated with access class information of the at least one Wi-Fi access point; and provide the access class information in the visualization of the RF propagation pattern of the at least one Wi-Fi access point.

Aspect 48: The computer readable medium of any of Aspects 33 to 47, wherein the computer readable medium further comprises instructions that, when executed by the computing system, cause the computing system to: mask one or more portions of the 3-D visualization of the RF propagation pattern that are outside of the building plan or obscured by one or more walls in the building plan.

What is claimed is:

1. A method comprising:
   calculating a radio frequency (RF) propagation pattern for at least one Wi-Fi access point based on a RF propagation model for the at least one Wi-Fi access point, the calculating including:
      projecting a plurality of ray-paths in a plurality of directions in a 3-D space, wherein the ray-paths originate from the at least one Wi-Fi access point and emanate in a variety of X, Y, and Z planes;
      determining whether the ray-paths interface with one or more objects defined in a building plan;
      for each ray-path of the ray-paths that interface with the one or more objects defined in the building plan, segmenting the respective ray-path into contiguous segments of substantially uniform mediums; and
      determining a RF signal strength at points along the contiguous segments of the ray-paths, wherein the RF signal strength degrades along the contiguous segments of the ray-paths as defined by the RF propagation model as a function of distance through the contiguous segments and characteristics of the RF propagation pattern through the substantially uniform mediums through which the segment traverses;
   setting a height for a 3-D visualization of the RF propagation pattern of the 3-D space;
   overlaying the RF propagation pattern for the at least one Wi-Fi access point over a visualization of the building plan to present the 3-D visualization of the RF propagation pattern of the 3-D space at the set height;
   masking one or more portions of the 3-D visualization of the RF propagation pattern that are outside of the building plan;
   receiving product information of the at least one Wi-Fi access point;
   providing one or more proposals to upgrade the at least one Wi-Fi access point;
   receiving assurance data associated with access class information of the at least one Wi-Fi access point; and
   providing the access class information in the visualization of the RF propagation pattern of the at least one Wi-Fi access point.

2. The method of claim 1, wherein the overlaying of the RF propagation pattern includes presenting a 3-D volume of one or more areas where the RF signal strength is lower than a threshold.

3. The method of claim 2, the method further comprising:
   providing one or more suggestions to increase the RF signal strength in the one or more areas over the threshold.

4. The method of claim 3, the method further comprising: presenting a simulated visualization of the RF propagation pattern based on the one or more suggestions.

5. The method of claim 1, further comprising:
   receiving input to modify the building plan;
   repeating the calculating the RF propagation pattern for the at least one Wi-Fi access point based on the RF propagation model for the at least one Wi-Fi access point based on the modified building plan; and
   presenting the 3-D visualization of the RF propagation pattern based on the modified building plan.

6. The method of claim 1, further comprising:
   receiving input to modify a configuration of the at least one Wi-Fi access point;
   repeating the calculating the RF propagation pattern for the at least one Wi-Fi access point based on the RF propagation model for the at least one Wi-Fi access point based on the modified configuration of the at least one Wi-Fi access point; and
   presenting the 3-D visualization of the RF propagation pattern based on the modified configuration of the at least one Wi-Fi access point.

7. The method of claim 1, further comprising:
   determining a point of view of the 3-D visualization of the RF propagation pattern.

8. The method of claim 1, wherein the at least one Wi-Fi access point is a plurality of Wi-Fi access points, the method further comprising:
   prior to the overlaying the RF propagation pattern for the plurality of Wi-Fi access points, determining interference of the RF propagation pattern for a first access point of the plurality of Wi-Fi access points with the RF signal strength for a second access point of the plurality of the Wi-Fi access points at any location; and
   adjusting the RF signal strength for the second access point along the segments of the ray-path based on the interference.

9. The method of claim 8, wherein the first access point is located on a different floor of the building plan than the second access point.

10. The method of claim 1 further comprising:
    the setting the height comprises setting a lower height and a higher height;
    the overlaying comprises continuously changing the 3-D visualization of the RF propagation pattern of the 3-D space at varying heights from the lower height to the higher height.

11. A system for visualizing a Wi-Fi access point RF propagation pattern in 3-D, comprising:
    a storage configured to store instructions;
    a processor configured to execute the instructions and cause the processor to perform operations comprising:
       calculate a radio frequency (RF) propagation pattern for at least one Wi-Fi access point based on a RF propagation model for the at least one Wi-Fi access point, the calculating of the RF propagation pattern including:
          projecting a plurality of ray-paths in a plurality of directions in a 3-D space, wherein the ray-paths originate from the at least one Wi-Fi access point and emanate in a variety of X, Y, and Z planes;
          determining whether the ray-paths interface with one or more objects defined in a building plan;
          for each ray-path of the ray-paths that interface with the one or more objects defined in the building plan, segmenting the respective ray-path into contiguous segments of substantially uniform mediums; and
          determining a RF signal strength at points along the contiguous segments of the ray-paths, wherein the RF signal strength degrades along the contiguous segments of the ray-paths as defined by the RF propagation model as a function of distance through the contiguous segments and characteristics of the RF propagation pattern through the substantially uniform mediums through which the segment traverses, setting a height for a 3-D visualization of the RF propagation pattern of the 3-D space;

overlay the RF propagation pattern for the at least one Wi-Fi access point over a visualization of the building plan to present the 3-D visualization of the RF propagation pattern of the 3-D space at the set height;

mask one or more portions of the 3-D visualization of the RF propagation pattern that are outside of the building plan;

receive product information of the at least one Wi-Fi access point;

provide one or more proposals to upgrade the at least one Wi-Fi access point;

receive assurance data associated with access class information of the at least one Wi-Fi access point; and provide the access class information in the visualization of the RF propagation pattern of the at least one Wi-Fi access point.

12. The system of claim 11, operations further comprising:

receive input to modify the building plan;

repeat the calculate the RF propagation pattern for the at least one Wi-Fi access point based on the RF propagation model for the at least one Wi-Fi access point based on the modified building plan; and present the 3-D visualization of the RF propagation pattern based on the modified building plan.

13. The system of claim 11, wherein the at least one Wi-Fi access point is a plurality of Wi-Fi access points, and the operations further comprising:

prior to the overlaying the RF propagation pattern for the plurality of Wi-Fi access points, determine interference of the RF propagation pattern for a first access point of the plurality of Wi-Fi access points with the RF signal strength for a second access point of the plurality of the Wi-Fi access points at any location; and adjust the RF signal strength for the second access point along the segments of the ray-path based on the interference.

14. The system of claim 11, wherein the building plan includes multiple floors and the at least one Wi-Fi access point is located on a first floor, wherein the operations further comprise:

include a view of an area on a second floor; and display a portion of the RF propagation pattern that overlaps with the area on the second floor.

15. The system of claim 11 further comprising:

the setting the height comprises setting a lower height and a higher height;

the overlay comprises continuously changing the 3-D visualization of the RF propagation pattern of the 3-D space at varying heights from the lower height to the higher height.

16. A non-transitory computer readable medium comprising instructions, the instructions, when executed by a computing system, cause the computing system to perform operations comprising:

calculate a radio frequency (RF) propagation pattern for at least one Wi-Fi access point based on a RF propagation model for the at least one Wi-Fi access point, the calculating of the RF propagation pattern including:

projecting a plurality of ray-paths in a plurality of directions in a 3-D space, wherein the ray-paths originate from the at least one Wi-Fi access point and emanate in a variety of X, Y, and Z planes;

determining whether the ray-paths interface with one or more objects defined in a building plan;

for each ray-path of the ray-paths that interface with the one or more objects defined in the building plan, segmenting the respective ray-path into contiguous segments of substantially uniform mediums; and determining a RF signal strength at points along the contiguous segments of the ray-paths, wherein the RF signal strength degrades along the contiguous segments of the ray-paths as defined by the RF propagation model as a function of distance through the contiguous segments and characteristics of the RF propagation pattern through the substantially uniform mediums through which the segment traverses; and set a height for a 3-D visualization of the RF propagation pattern of the 3-D space; and overlay the RF propagation pattern for the at least one Wi-Fi access point over a visualization of the building plan to present the 3-D visualization of the RF propagation pattern of the 3-D space at the set height;

mask one or more portions of the 3-D visualization of the RF propagation pattern that are outside of the building plan;

receive product information of the at least one Wi-Fi access point;

provide one or more proposals to upgrade the at least one Wi-Fi access point;

receive assurance data associated with access class information of the at least one Wi-Fi access point; and provide the access class information in the visualization of the RF propagation pattern of the at least one Wi-Fi access point.

17. The computer readable medium of claim 16, the operations further comprising:

receive input to modify the building plan;

repeat the calculate the RF propagation pattern for the at least one Wi-Fi access point based on the RF propagation model for the at least one Wi-Fi access point based on the modified building plan; and present the 3-D visualization of the RF propagation pattern based on the modified building plan.

18. The computer readable medium of claim 16, wherein the at least one Wi-Fi access point is a plurality of Wi-Fi access points, and to the operations further comprising:

prior to the overlaying the RF propagation pattern for the plurality of Wi-Fi access points, determine interference of the RF propagation pattern for a first access point of the plurality of Wi-Fi access points with the RF signal strength for a second access point of the plurality of the Wi-Fi access points at any location; and adjust the RF signal strength for the second access point along the segments of the ray-path based on the interference.

19. The computer readable medium of claim 16, wherein the building plan includes multiple floors and the at least one Wi-Fi access point is located on a first floor, and to the operations further comprise:

include a view of an area on a second floor; and
display a portion of the RF propagation pattern that overlaps with the area on the second floor.

20. The non-transitory computer readable medium of claim 16 further comprising:
the set the height comprises set a lower height and a higher height;
the overlay comprises continuously changing the 3-D visualization of the RF propagation pattern of the 3-D space at varying heights from the lower height to the higher height.

* * * * *